(12) United States Patent
Hill et al.

(10) Patent No.: US 10,331,769 B1
(45) Date of Patent: Jun. 25, 2019

(54) INTERACTION BASED PRIORITIZED RETRIEVAL OF EMBEDDED RESOURCES

(75) Inventors: Peter F. Hill, Seattle, WA (US);
Matthew L. Trahan, Seattle, WA (US);
Andrew Hayden, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 242 days.

(21) Appl. No.: 13/428,498

(22) Filed: Mar. 23, 2012

(51) Int. Cl.
*G06F 17/00* (2019.01)
*G06F 17/22* (2006.01)

(52) U.S. Cl.
CPC ................................ *G06F 17/2235* (2013.01)

(58) Field of Classification Search
CPC ... G06F 17/2235; G06F 17/30; G06F 17/3089
USPC .......................................................... 715/205
See application file for complete search history.

(56) References Cited

U.S. PATENT DOCUMENTS

| | | | |
|---|---|---|---|
| 5,826,031 A | 10/1998 | Nielsen | |
| 6,055,569 A | 4/2000 | O'Brien et al. | |
| 6,182,133 B1 | 1/2001 | Horvitz | |
| 6,301,617 B1 * | 10/2001 | Carr | G06F 9/5027 709/219 |
| 6,553,393 B1 | 4/2003 | Eilbott et al. | |
| 6,583,781 B1 | 6/2003 | Joshi et al. | |
| 7,516,118 B1 | 4/2009 | Badros et al. | |
| 7,694,008 B2 | 4/2010 | Chang et al. | |
| 7,716,332 B1 | 5/2010 | Topfl et al. | |
| 7,747,749 B1 | 6/2010 | Erikson et al. | |
| 7,934,161 B1 | 4/2011 | Denise | |
| 8,127,253 B2 | 2/2012 | Sauve et al. | |
| 8,156,429 B2 * | 4/2012 | Lotenberg | G06F 17/30899 715/255 |
| 8,286,176 B1 * | 10/2012 | Baumback et al. | 718/104 |
| 8,566,696 B1 | 10/2013 | Hamon et al. | |
| 8,751,925 B1 * | 6/2014 | Zhang et al. | 715/241 |

(Continued)

OTHER PUBLICATIONS

Authors et. al, System and method to automatically provide optimal content based on vision and eye movement, Jun. 21, 2011, IPCOM000208045D, pp. 2-6.*

*Primary Examiner* — Scott T Baderman
*Assistant Examiner* — Hassan Mrabi
(74) *Attorney, Agent, or Firm* — Knobbe, Martens, Olson & Bear, LLP

(57) ABSTRACT

Features are described for the retrieval and processing of network resources in anticipation of their request, and to the display of information about linked network resources prior to activation of the link. For example, embedded resources associated with network resources can be prioritized, and a network computing component can retrieve and process the prioritized embedded resources in response to a determination that there is a likelihood exceeding a threshold that the network resource will be requested. A network computing component can also retrieve linked network resources or portions thereof prior to any determination that a linked network resource may be requested, and then in anticipation of a request for a linked network resource the network computing provider can initiate processing of the linked network resource. Additionally, a client device can display visual effects associated with links to network resources in anticipation of user activation of the links.

28 Claims, 19 Drawing Sheets

(56) References Cited

U.S. PATENT DOCUMENTS

| | | | |
|---|---|---|---|
| 9,158,845 B1* | 10/2015 | Reddy | G06F 17/30864 |
| 9,231,949 B1* | 1/2016 | Jenkins | H04L 63/0807 |
| 9,307,004 B1* | 4/2016 | Hayden | H04L 67/2838 |
| 2002/0075315 A1 | 6/2002 | Scott | |
| 2004/0255237 A1 | 12/2004 | Tong | |
| 2006/0143568 A1* | 6/2006 | Milener et al. | 715/738 |
| 2007/0074125 A1 | 3/2007 | Platt et al. | |
| 2007/0256003 A1 | 11/2007 | Wagoner et al. | |
| 2008/0201331 A1* | 8/2008 | Eriksen et al. | 707/10 |
| 2008/0301300 A1 | 12/2008 | Toub | |
| 2010/0218098 A1* | 8/2010 | Sitrick et al. | 715/719 |
| 2011/0029641 A1 | 2/2011 | Fainberq et al. | |
| 2011/0175932 A1 | 7/2011 | Yu et al. | |
| 2011/0197124 A1* | 8/2011 | Garaventa | 715/234 |
| 2012/0017182 A1 | 1/2012 | Bau | |
| 2012/0060083 A1* | 3/2012 | Yuan | G06F 17/30899 715/234 |
| 2012/0137201 A1 | 5/2012 | White et al. | |
| 2012/0221505 A1 | 8/2012 | Evans et al. | |
| 2012/0221932 A1 | 8/2012 | Gleadall et al. | |
| 2012/0284597 A1* | 11/2012 | Burkard et al. | 715/205 |
| 2013/0007260 A1 | 1/2013 | Jain et al. | |
| 2013/0047100 A1 | 2/2013 | Kroeger et al. | |
| 2013/0159507 A1* | 6/2013 | Mason et al. | 709/224 |

\* cited by examiner

INTERACTION BASED PRIORITIZED RETRIEVAL OF EMBEDDED RESOURCES

BACKGROUND

Generally described, computing devices and communication networks can be utilized to exchange information. In a common application, a computing device can request content from another computing device via a communication network. For example, a user at a personal computing device can utilize a software browser application, typically referred to as a browser, to request a web page from a server computing device via the Internet. In such embodiments, the user computing device can be referred to as a client computing device and the server computing device can be referred to as a content provider.

A web page or other network-accessible content item may be associated with a number of embedded resources, such as images or videos to be displayed, style sheets to control formatting, or scripts to be executed. A browser typically processes embedded resource identifiers to generate requests for the items. Embedded resources may contain references to other embedded resources, and so on. In many cases, the web page may also contain one or more links to other web pages, which are also associated with a number of embedded resources. When a user activates a link to another web page, a new request is generated for the linked web page, and the retrieval and processing begins again.

BRIEF DESCRIPTION OF THE DRAWINGS

Embodiments of various inventive features will now be described with reference to the following drawings, wherein.

DETAILED DESCRIPTION

Figure 1A:
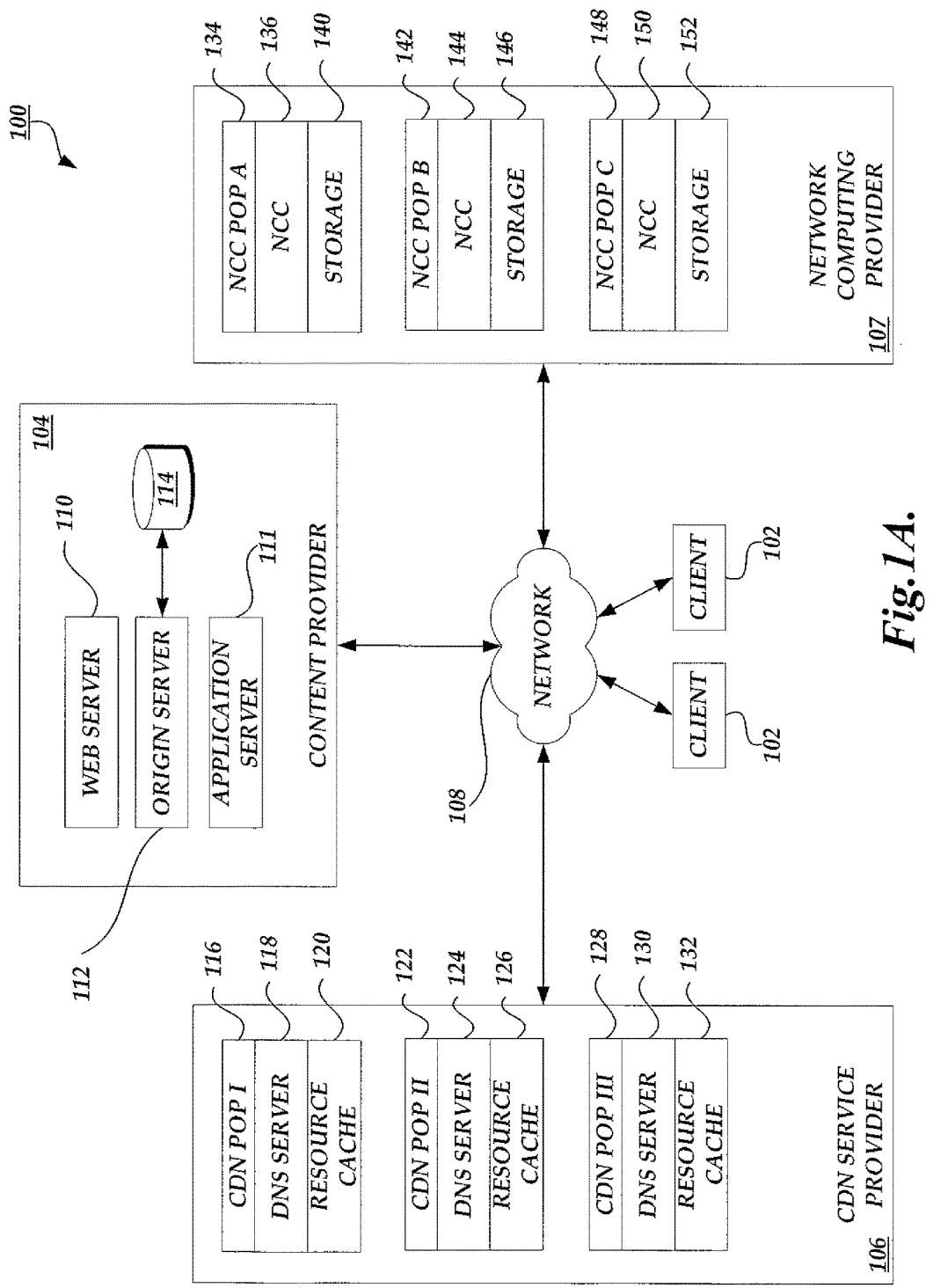
FIG. 1A is a block diagram illustrative of a content delivery environment including a number of client computing devices, content provider, a content delivery network service provider, and a network computing provider.

Generally described, the present disclosure is directed to the retrieval and processing of network resources. Specifically, aspects of the present disclosure relate to the retrieval and processing of a network resource, by a network computing device, prior to the indication of a request for the network source by a client computing device. In one embodiment, embedded resources associated with a network resource may be prioritized such that the retrieval and processing of the prioritized embedded resources occurs in response to a determination that the network resource will be requested. For example, a user of a client computing device may initiate movement of a cursor toward a link to a web page, and in response a network computing component can initiate retrieval of one or more prioritized resources associated with the linked web page in anticipation of user activation of the link.

Other aspects of the present disclosure relate to display of visual effects associated with links to network resources in anticipation of user activation of the links. For example, a user may initiate a cursor movement toward a link to a web page, and in response the client computing device can display a message that includes information about the linked web page, such as its usefulness or links to alternative web pages.

Although aspects of the embodiments described in the disclosure will focus, for the purpose of illustration, on the retrieval and processing of network resources by a network computing component, such as an intelligent proxy server, application server, or other network node, one skilled in the art will appreciate that the techniques disclosed herein may be applied to any number of hardware or software processes or applications. Further, although various aspects of the disclosure will be described with regard to illustrative examples and embodiments, one skilled in the art will appreciate that the disclosed embodiments and examples should not be construed as limiting.

With reference to an illustrative embodiment, a user of a client computing device can launch a software browser application (browser) and issue requests for network resources, such as web pages, images, videos, applets, documents, and other content pages. Rather than issue the requests directly to the content provider or other content source, as may happen in a typical environment, the request can be issued to an intermediary entity, such as a network computing provider configured to provide additional processing features and capabilities, such as retrieval and processing of prioritized embedded resources associated with network resources likely to be requested, and provision of information about network resources likely to be requested. The network computing provider may have any number of network computing components (NCCs), such as web servers, proxy servers, application servers, and the like.

An NCC can receive, from a client computing device, a request for a web page. The NCC can launch a virtual machine instance to process the request, retrieve the requested resources, and process the retrieved resources. In some embodiments, the virtual machine instance can include a browser configured to perform the same or similar processing to web pages as the browser application on the client computing device. The NCC can retrieve the requested web page, and determine which processing actions are to be performed by the browser at the NCC and which are to be performed by the browser at the client computing device. The NCC can then perform any processing actions assigned to the NCC, and transmit a response to the client computing device. Upon receipt of the response, the client computing device can then perform any remaining processing actions and display the web page to the user. The client computing device and the NCC may repeat this process as desired by the user of the client computing device.

A web page may include any number of links to other web pages. The NCC can be configured to retrieve the linked web pages, or portions thereof, prior to receiving any request for a linked web page. This can reduce retrieval latencies associated with the linked web pages if one is requested by a client computing device. Each linked web page may be associated with any number of embedded resources, such as image files, videos, JavaScript files, and the like. The client computing device can monitor user interactions with a web page, such as cursor movements reflective of mouse manipulations, and determine a likelihood that a user will activate a link to another web page. If the likelihood exceeds a threshold, the client computing device can notify the NCC, and the NCC can initiate retrieval of the linked web page or some portion thereof before the user activate the link.

In one example, a JavaScript file associated with a linked web page may itself contain embedded references to other resources, such as images and other JavaScript files. The JavaScript file may include executable code that loads an image file for display. The NCC can analyze the linked web page and embedded resources over the course of many requests from other users, and determine that retrieval of the image file referenced in the JavaScript file creates a bottleneck in retrieval, processing, and rendering of the linked web page. That image file can be prioritized over other embedded resources associated with the linked web page, even though in a standard retrieval pattern most other resources may be retrieved prior to the image file. When the client computing device notifies the NCC that there is a likelihood exceeding a threshold that a link to the linked web page will be activated, such as when a user initiates a cursor movement toward the link, the NCC can initiate retrieval of the image file prior to any other embedded resource associated with the linked web page, and prior to the user activating the link to request the linked web page.

Additionally or alternatively, the NCC can transmit information about the linked web page to the client computing device. The information can include user reviews of the linked web page, an image of the linked web page, a link to an alternative page associated with the same subject matter as the linked web page, etc. The client computing device can display a visual effect near the link in response to determining that a user is initiating an interaction that is likely to result in activation of the link. The visual effect can include display of a message containing the information received from the NCC or an alteration to the visual properties of the link, and can be displayed before the user activates the link.

FIG. 1A is a block diagram illustrative of a networked computing environment 100 for the management and processing of content requests. As illustrated in FIG. 1A, the networked computing environment 100 includes a number of client computing devices 102 (generally referred to as clients) for requesting content and content processing from a content provider 104, CDN service provider 106, or network computing provider 107. In an illustrative embodiment, the client computing devices 102 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing provider 107, etc.) via the communication network 108. The content provider 104 illustrated in FIG. 1A corresponds to a logical association of one or more computing devices associated with a content provider. Specifically, the content provider 104 can include a web server component 110 corresponding to one or more server computing devices for obtaining and processing requests for content (such as web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1A, the content provider 104 can be associated with one or more DNS name server components that would be authoritative to resolve client computing device DNS queries corresponding to a domain of the content provider.

With continued reference to FIG. 1A, the networked computing environment 100 can further include a CDN service provider 106 in communication with the one or more client computing devices 102 and other service providers via the communication network 108. The CDN service provider 106 illustrated in FIG. 1A corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1A as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With further continued reference to FIG. 1A, the networked computing environment 100 can also include a network computing provider 107 in communication with the one or more client computing devices 102, the CDN service provider 106, and the content provider 104 via the communication network 108. The network computing provider 107 illustrated in FIG. 1A also corresponds to a logical association of one or more computing devices associated with a network computing provider. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, and resources from content providers that will be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing provider 107 may maintain separate POPs for providing the NCC and the storage components. Additionally, although the NCC POPs 134, 142, 148 are illustrated in FIG. 1A as logically associated with a network computing provider 107, the NCC POPs will be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 and components of the CDN service provider 106 can be managed by the same or different entities.

Figure 1B:
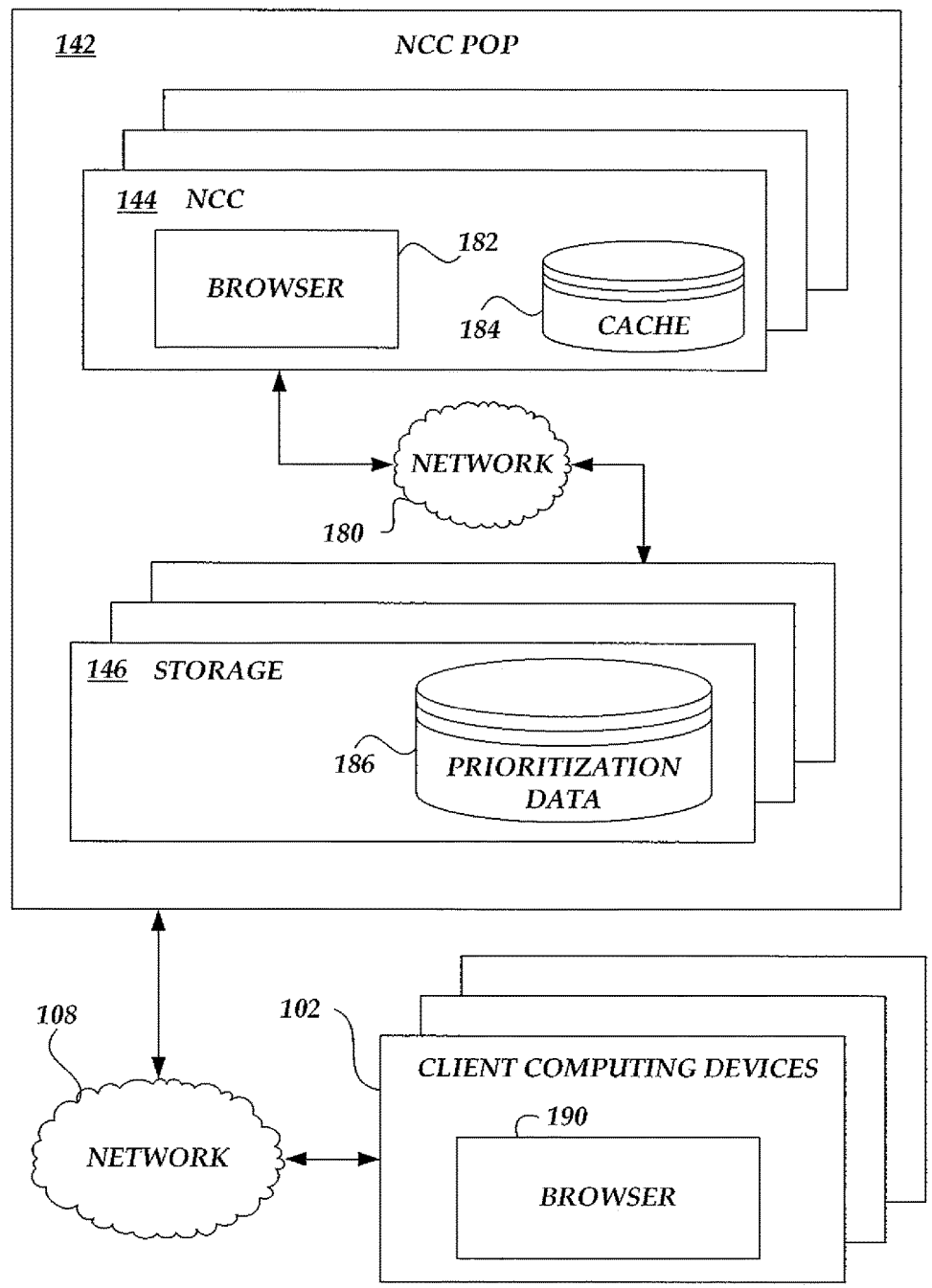
FIG. 1B is a block diagram illustrative of a network computing component point-of-presence in communication with a client computing device.

FIG. 1B is a block diagram schematically illustrating an example of an NCC POP 142, described above with respect to FIG. 1A, that can provide computing resources to multiple client computing devices 102 via a communication network 108. For example, and as described in detail herein, the NCC POP 142 can include any number of NCCs 144 to manage requests from a client computing device 102. An NCC 144 can retrieve a network resource, such as a web page, image, video file, applet, animation, document, or other content object of a web site, from a content source, such as a content provider 104 or CDN service provider 106 as illustrated in FIG. 1A. In addition, the NCC 144 can be configured to determine browsing configurations, which can distribute the processing of network resources between the NCC 144 and the requesting client computing device 102. The NCC 144 can be configured with a browser component 182 that can perform some or all of the processing actions that may typically be performed by a browser 190 on a client computing device 102. For example, the browser component 182 of the NCC 144 can include a JavaScript engine for compiling and executing JavaScript code embedded in web pages. The NCC 144 can also include a cache 184 for storing network resources and embedded resources that have been previously requested or are likely to be requested in the future. Under some browsing configurations, the NCC 144 can process some or all of a requested network resource, either exclusively or in parallel with the client computing device 102. The result of such browsing configurations can be an improvement in performance, speed, reliability, privacy, etc., when compared to the client computing device 102 processing the network resources exclusively.

The NCC POP 142 can include any number of storage components 146, which may include one or more non-transitory storage devices. The storage components 146 can be configured to store prioritization data 186. The prioritization data 186 can indicate which embedded resources associated with a network resource, such as referenced JavaScript libraries, cascading style sheet (CSS) files, images, videos, animations, and applets, to prioritize during retrieval. Prioritizing retrieval of certain resources can improve the experience of users of client computing devices 102 when requesting the network resource in the future. The prioritization data 186 can include historical records of retrieval latencies associated with specific resources, data regarding chained references to specific resources, data regarding which resources may be within an initially viewable area of a display, data regarding historical processing times associated with the resource, data regarding the file size of the resource, data regarding the geographic location of the content source hosting the resource, and the like. The NCCs 144 and storage components 146 can communicate with each other over a network 180. The network 180 may, for example, be a private network, such as, for example, a corporate or university network that is wholly or partially inaccessible to non-privileged users. In some embodiments, the network 180 may be a publically accessible network and/or have access to and from the Internet.

In operation, a user of a client computing device 102 can use a browser 190 to request a network resource, such as a web page. As described herein, the request can be transmitted to a an NCC POP 142 of a network computing provider 107 instead of directly to a content source, and an NCC 144 associated with the NCC POP 142 can retrieve and process the requested web page, and transmit the requested page to the client computing device 102. Processing the requested web page can include analyzing it to determine if it contains links to other web pages. To facilitate faster processing and response times to subsequent requests for linked web pages, the NCC 144 can retrieve prioritized resources or entire web pages prior to the user of the client computing device 102 requesting the linked web page. For example, the NCC 144 can retrieve the HTML file for each web page linked from the requested web page, and can store the HTML file in the cache 184 or in some other component. When there is a likelihood exceeding a threshold that a user will request a linked web page, such as when the user initiates a cursor movement toward a link, the client computing device 102 can notify the NCC 144. The NCC 144 can then load the HTML file corresponding to the web page associated with the link into a browser component 182 for processing, and potentially for transmission to the client computing device 102 if the user activates the link. In another example, the client computing device 102 can notify the NCC 144 when a user initiates a cursor movement that is likely to end on a link, and the NCC 144 can initiate retrieval of one or more prioritized resources associated with the linked web page. The prioritized resources can be the largest resources, the resources that historically take the longest amount of time to retrieve, resources that create a bottleneck during web page rendering if they have not yet been retrieved, etc.

The user of the client computing device 102 can interact with the initially requested page, for example by moving a mouse cursor on a display of the web page, or by looking at different portions of the displayed web page. The client computing device 102 can be configured to track such interactions and determine which link, if any, a user may click next, and then notify the NCC 144 of which link may be clicked next. When the user initiates a cursor movement with a mouse, the client computing device 102 can use historical interaction data associated with the user and information about the instant movement, such as direction, acceleration, movement arc, and the like in order to make the determination. If the client computing device 102 is equipped with a user-facing camera, it can track a user's eye movements and determine which link the user may click based on which link the user is looking at, how long the user looks at the link, etc. In some embodiments, the camera or some other sensor can track hand movements when the client computing device 102 is configured with a touch screen, and therefore no mouse movements will be input. In some embodiments, information about the user's historical mouse, eye, or hand movements, or a profile of how the user interacts with network resources, can stored at the NCC POP 142 or some other component of the network computing provider 107 so that a user's specific usage characteristics can be available on any client computing device 102 the user may use. Storage of the information at the network computing provider 107 can be beneficial because such characteristics may be specific to the user, for example the way that the user moves the mouse in a curved path toward a link.

In some embodiments the NCC 144 can be configured to transmit information associated with the linked resource when a user is likely to click a link, instead of or in addition to retrieving or processing resources associated with the linked web page. For example, in response to receiving a notification from the client computing device 102 that a user is likely to click a particular link, the NCC 144 can transmit information to the client computing device 102 indicating the usefulness of the link, as observed by a number of previous users who may have viewed the linked web page. If a high percentage of previous users have viewed the linked web page for only a short period of time, the NCC 144 can transmit to the client computing device 102 a message indicating that users have not found the linked page helpful. The NCC 144 can also transmit a link to a different web page if users have subsequently viewed, for a longer period of time, a web page associated with the same subject matter. In response to receiving the message and/or the link, the client computing device 102 can display the message and/or the link to the user. In some embodiments, the NCC 144 can transmit a warning to the user indicating that the linked web page contains objectionable content or content that is potentially harmful to the client computing device 102. In response to receiving such warning, the client computing device 102 can display a visual effect to the user, such as a red boarder around the link.

With reference now to FIGS. 2, 3, 4, 5, 6A, and 6B (FIGS. 2-6), the interaction between various components of the networked computing environment 100 of FIG. 1A will be illustrated. Specifically, FIGS. 2-6 illustrate the interaction between various components of the networked computing environment 100 for the exchange of content between a client computing device 102 and a content provider 104 via the network computing provider 107. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
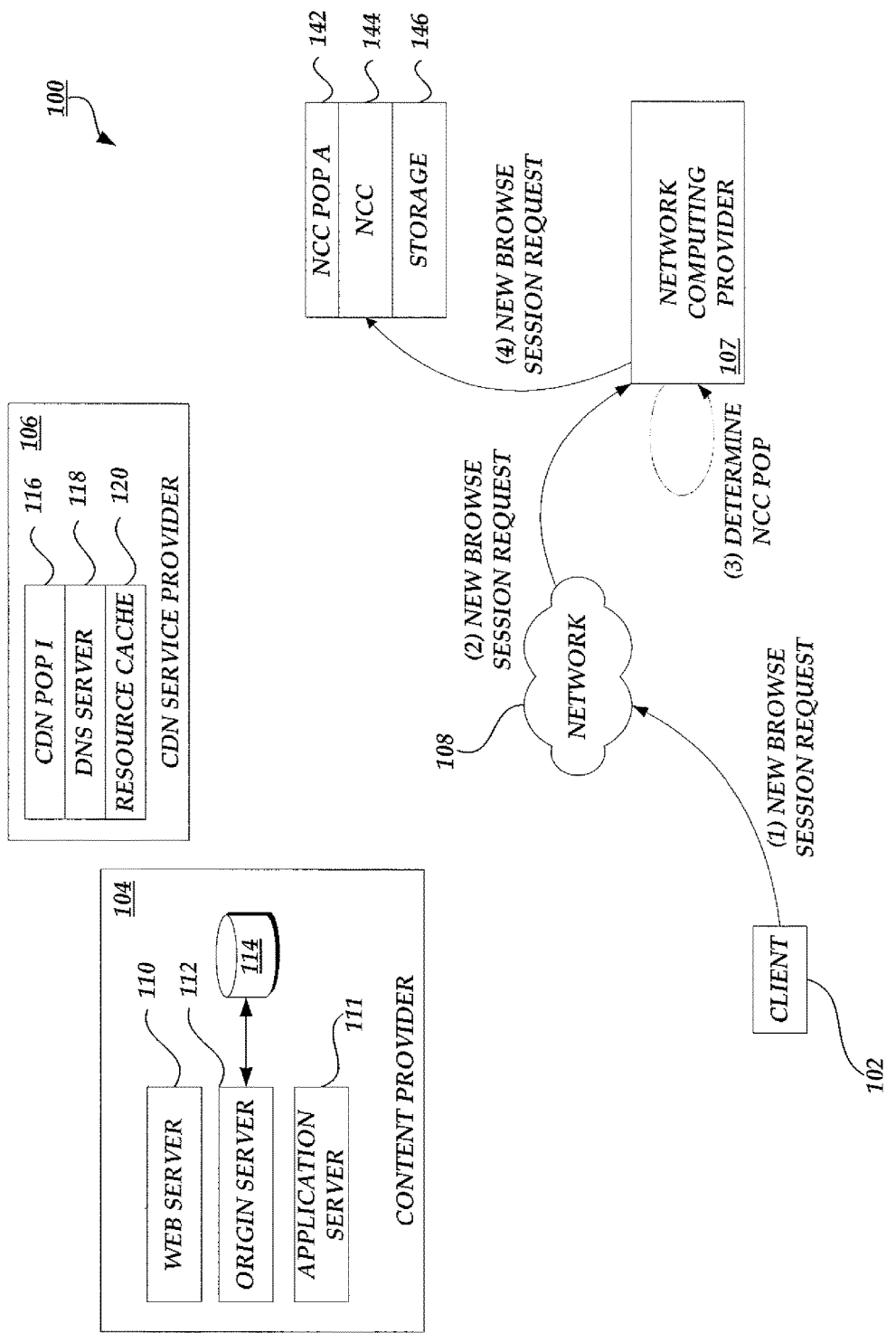
FIG. 2 is a block diagram of the content delivery environment of FIG. 1A illustrating the generation and processing of a new browse session request from a client computing device to a network computing provider.

With reference to FIG. 2, the process can begin with the generation and processing of a browse session request from a client computing device 102 to a network computing provider 107 will be described. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2, the browse session request is transmitted first to a network computing provider 107. In an illustrative embodiment, the network computing provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Subsequent to the receipt of the browse session request, the network computing provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102.

Figure 3:
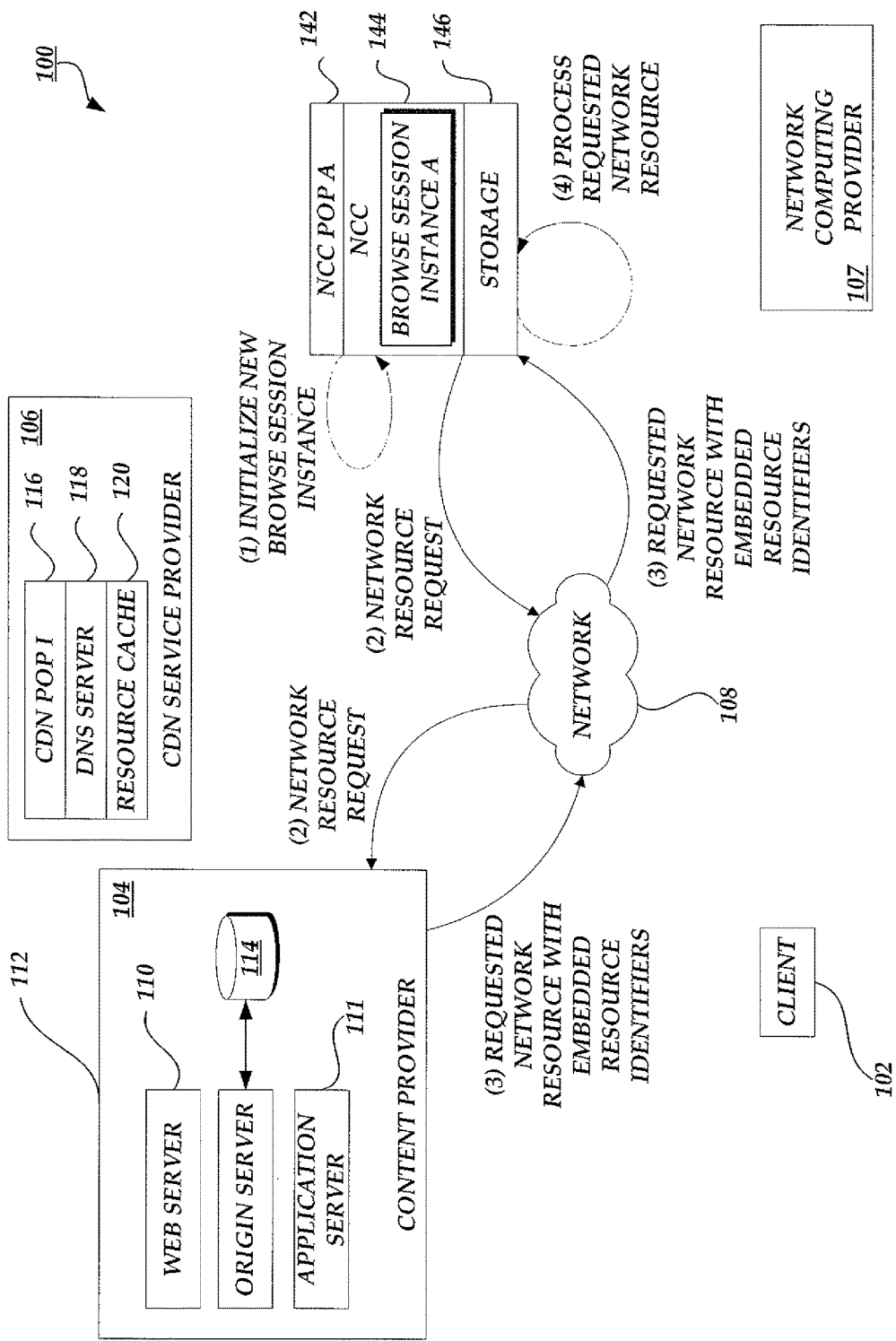
FIG. 3 is a block diagram of the content delivery environment of FIG. 1A illustrating the generation and processing of a request for a network resource from a network computing provider to a content provider.

With reference to FIG. 3, an illustrative interaction for generation and processing of a request for a network resource from a network computing provider 107 to a content provider 104 will be described. As illustrated in FIG. 3, the selected NCC POP 142 may generate a browse session corresponding to one or more content providers based on a browse session request, such as the illustrative browse session request depicted in FIG. 2 above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a web page, such as "http://www.xyzsite.com/default.htm." NCC POP 142 may resolve the URL to an IP address through a DNS resolver associated with the network computing provider (not shown), and may request the web page from the content provider 104 at the resolved IP address. In various embodiments, a network resource may be retrieved from any combination of content providers, content delivery network (hereinafter "CDN") servers, or caches associated with the network computing provider 107. For example, the network computing provider may check if a resource is stored in a local cache or in another server or service provider associated with the network computing provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a web page may include embedded CSS style information and JavaScript as well as embedded resource identifiers to additional resources such as text, images, video, audio, animation, executable code, and other HTML, CSS, and JavaScript files. In the process of extracting the embedded resource identifiers, the NCC POP 142 may gather information about the processed network resources for later use in the determination of a remote session browsing configuration as discussed below with reference to FIG. 4.

The NCC POP 142 may additionally process the requested network resource to determine whether the requested network resource contains links to other network resources. The NCC POP 142 can utilize the links to begin the process of determining whether there are prioritized resources associated with the linked network resource. Such prioritized resources may be retrieved prior the linked network resource being requested by a user in order to speed the retrieval and processing of the linked network resource. The NCC POP 142 can also initiate requests for the linked network resources or portions thereof, such as the primary HTML file associated with the linked network resource.

Figure 4:
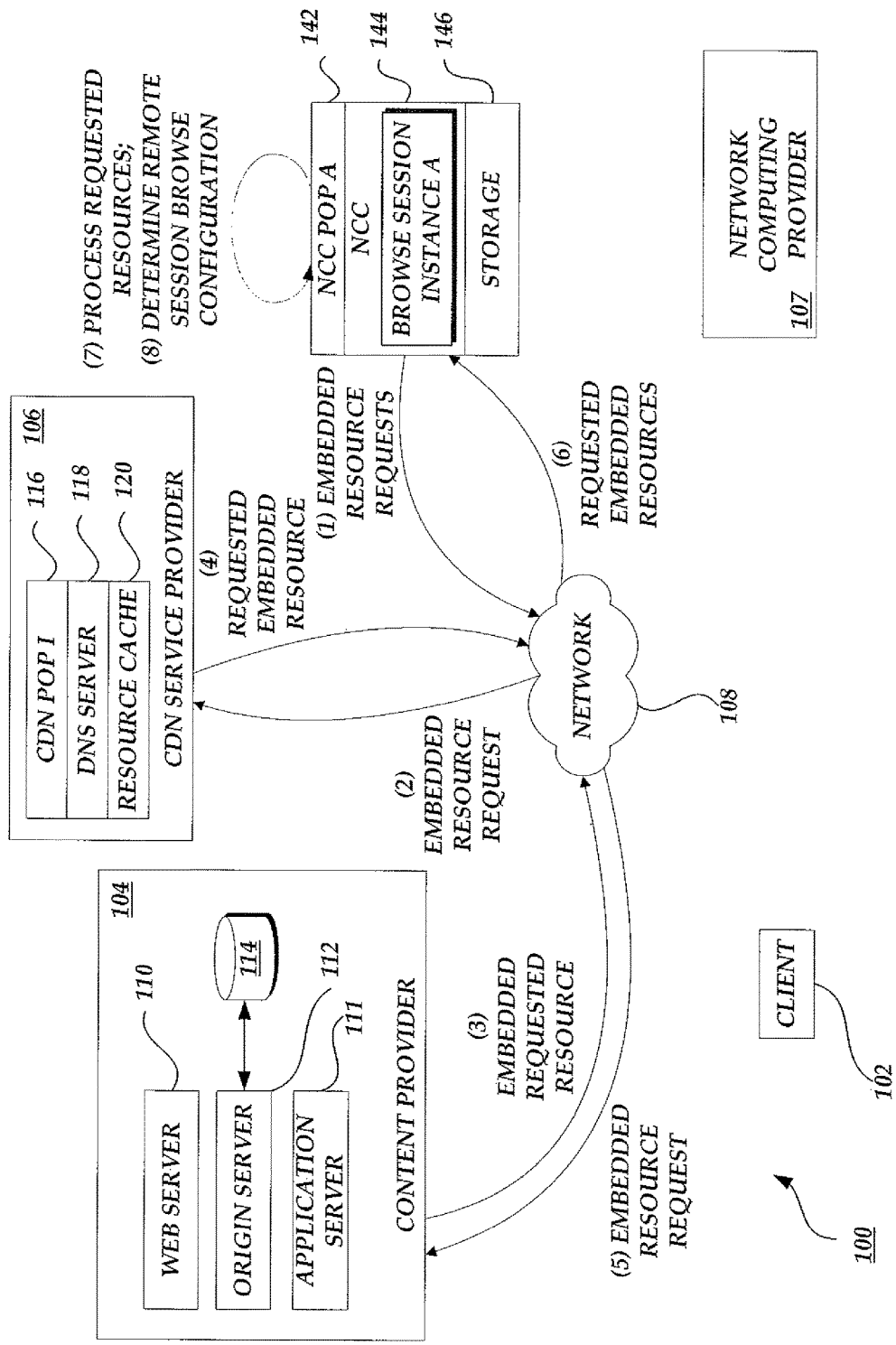
FIG. 4 is a block diagram of the content delivery environment of FIG. 1A illustrating the generation and processing of one or more requests corresponding to one or more embedded resources from a network computing provider to a content provider and content delivery network.

With reference to FIG. 4, an illustrative interaction for generation and processing of one or more requests corresponding to one or more embedded resources from a network computing provider to a content provider and content delivery network is disclosed. As illustrated in FIG. 4, the selected NCC POP 142 may provide resource requests to one or more sources of content such as content provider 104 and CDN POP 116. The resource requests may correspond to embedded resources based on one or more embedded resource identifiers extracted from a requested network resource (e.g., a web page) as described in FIG. 3 above. In various embodiments, embedded resources may be retrieved from any combination of content providers, CDN servers, or caches associated with the network computing provider 107. For example, the network computing provider may check if an embedded resource is stored in a local cache or in another server or service provider associated with the network computing provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102.

Figure 5:
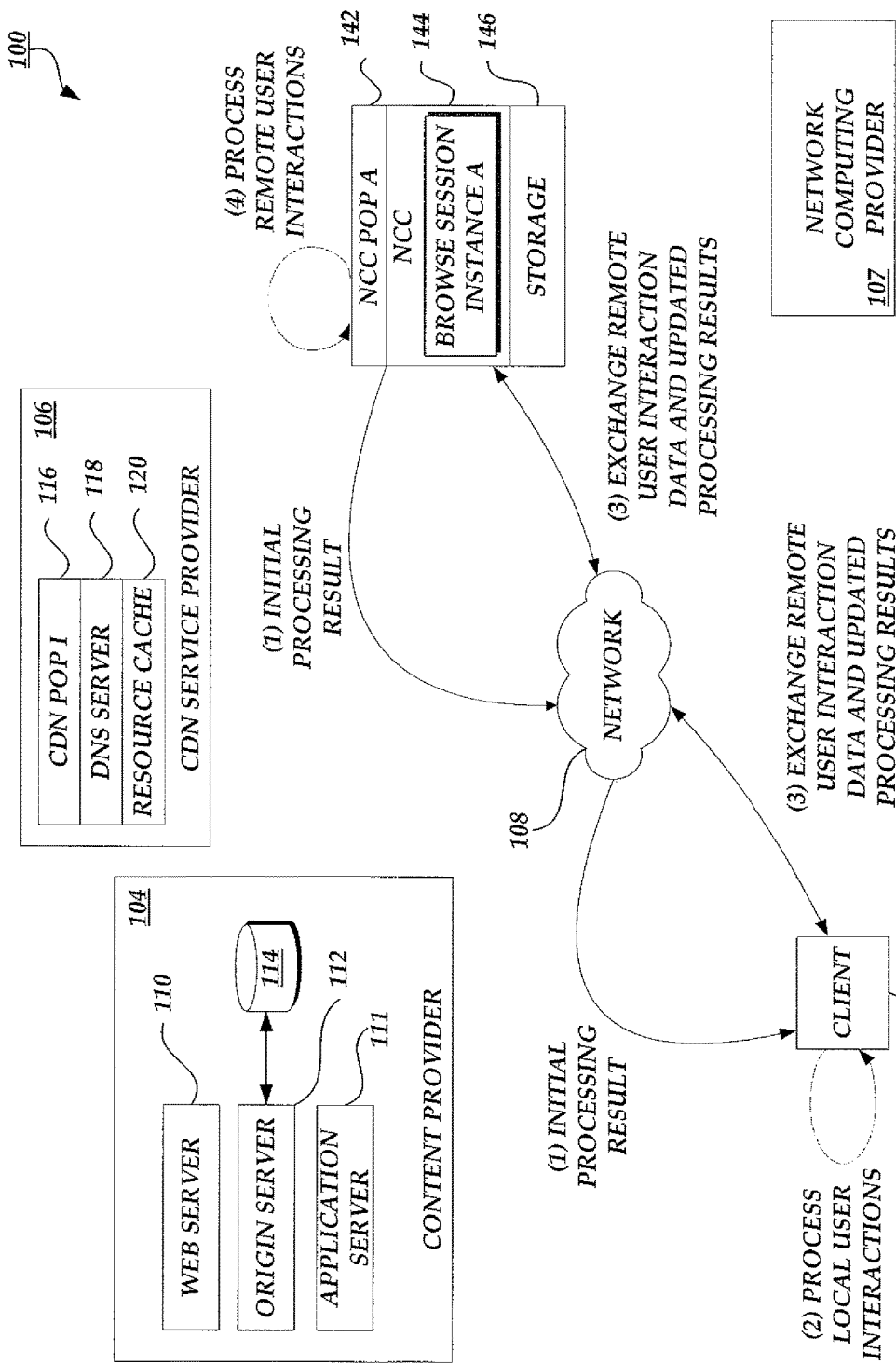
FIG. 5 is a block diagram of the content delivery environment of FIG. 1A illustrating the generation and processing of browse session data and user interaction data between a network computing provider and client computing device.

With reference to FIG. 5, an illustrative interaction for generation and processing of processing results and user interaction data between a network computing provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5, the selected NCC POP 142 may provide an initial processing result to the client computing device 102 over the network 108. The initial processing result may correspond to requested network content, such as a web page, along with associated embedded resources processed by the NCC POP 142 in accordance with a selected remote session browsing configuration as described in FIG. 4 above. Additionally, the NCC POP 142 also makes a determination of which additional processes will be conducted at the NCC POP 142, at the client computing device 102, or both. Subsequent to receiving an initial processing result and the allocation of processes, the client computing device 102 may perform any remaining processing actions on the initial processing result as required by the selected remote session browsing configuration, and may display the fully processed content in a content display area of a browser.

The client computing device 102 may process any local user interactions with local interface components or content elements locally, and may provide user interactions requiring remote processing to the network computing provider 107. For example, the client computing device 102 may transmit, to the NCC POP 142, a notification that a user has initiated a cursor movement that is likely (or has a likelihood exceeding a threshold) to result in activation of a link to another network resource. The network computing provider 107 may provide updated processing results to the client computing device in response to changes to the content or remote user interaction data from the client computing device. For example, the NCC POP 142 may provide a prioritized resource associated with a linked network resource. In another example, the NCC POP 142 may initiate retrieval and/or processing, in the browser of the network computing component instance, of the linked network resource or some portion thereof so that the NCC POP 142 can provide an initial processing result to the client computing device 102 immediately upon user activation of a link to the linked network resource. In yet another example, the NCC POP 142 may transmit information causing the client computing device 102 to display a visual effect or some message associated with the link. The client computing device 102 may transmit many notifications to the NCC POP 142 before the user activates a link, and in some cases the user may not activate any link.

Figure 6:
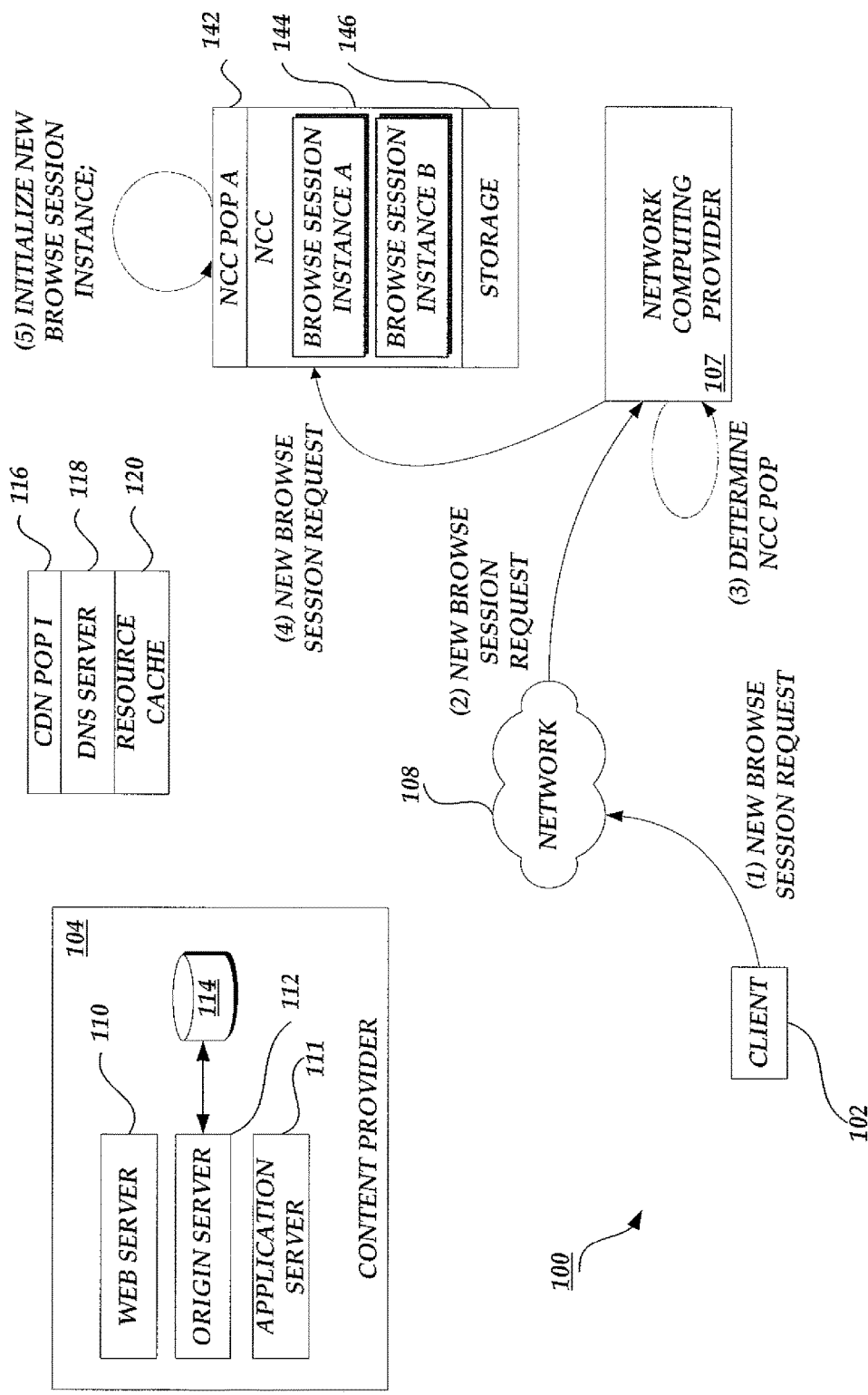
FIG. 6 is a block diagram of the content delivery environment of FIG. 1A illustrating the generation and processing of an additional new browse session request from a client computing device to a network computing provider.

With reference to FIG. 6, a block diagram of the content delivery environment of FIG. 1A illustrating the generation and processing of an additional new browse session request from a client computing device to a network computing provider is disclosed. As illustrated in FIG. 6, a second new browse session request may be sent to network computing provider 107 from client computing device 102 across network 108. In an illustrative embodiment, the network computing provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first web page corresponding to a first browse session instance may follow a link that opens a new tab or browser window to view a second web page. In one embodiment, any required steps of obtaining and processing content associated with the second web page may be performed by the currently instantiated network computing component in which the browser can handle the processing of both resource requests. For example, the instantiated network computing component may have received a notification from the client computing device 102 that the user was likely to activate the link to the second web page. The NCC POP 142 may have initiated retrieval of prioritized resources and/or begun processing the web page prior to receiving the notification the user activated the link. In another embodiment, the client computing device 102 request may be processed as a new browse session request to the network computing provider 107, including the network address of the second web page. In this embodiment, the browser on the client computing device may not specifically request a separate browse session, and a user's interaction with the browser on the client computing device 102 may appear to be part of a same browsing session. As described above with regard to FIGS. 2 and 3, the network computing provider 107 may cause an instantiation of a network computing component for obtaining and processing content associated with the second web page. In other embodiments, a new browse session request may be generated by the client computing device 102 corresponding to sections of a network resource (e.g., frames of a web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. Requested content may include any manner of digital content, including web pages or other documents, text, images, video, audio, executable scripts or code, or any other type of digital resource.

Subsequent to the receipt of the browse session request, the network computing provider 107 may select an associated network computing component such as NCC POP 142 to service the browse session request. As discussed above with reference to FIG. 2, a network computing provider 107 may select an NCC POP to service a browse session request based on any number of factors, including, but not limited to available NCC POP resources (e.g., available memory, processor load, network load, etc), a financial cost of servicing the browse session request at the NCC POP, the NCC POP location respective to a client computing device 102, content provider 112, or CDN POP 116, a NCC POP cache status (e.g., whether a requested resource is already stored in an NCC POP cache), etc. In one embodiment, the network computing provider 107 may select a number of NCC POPs to service a browse session request. Illustratively, although the network computing provider 107 is depicted here for purposes of illustration as selecting NCC POP 142, the network computing provider 107 may select any extant NCC POP to service the browse session request. For example, a single client computing device 102 may simultaneously or sequentially provide three different browse session requests to the network computing provider 107 corresponding to different network resources. The network computing provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2.

Figure 7A:
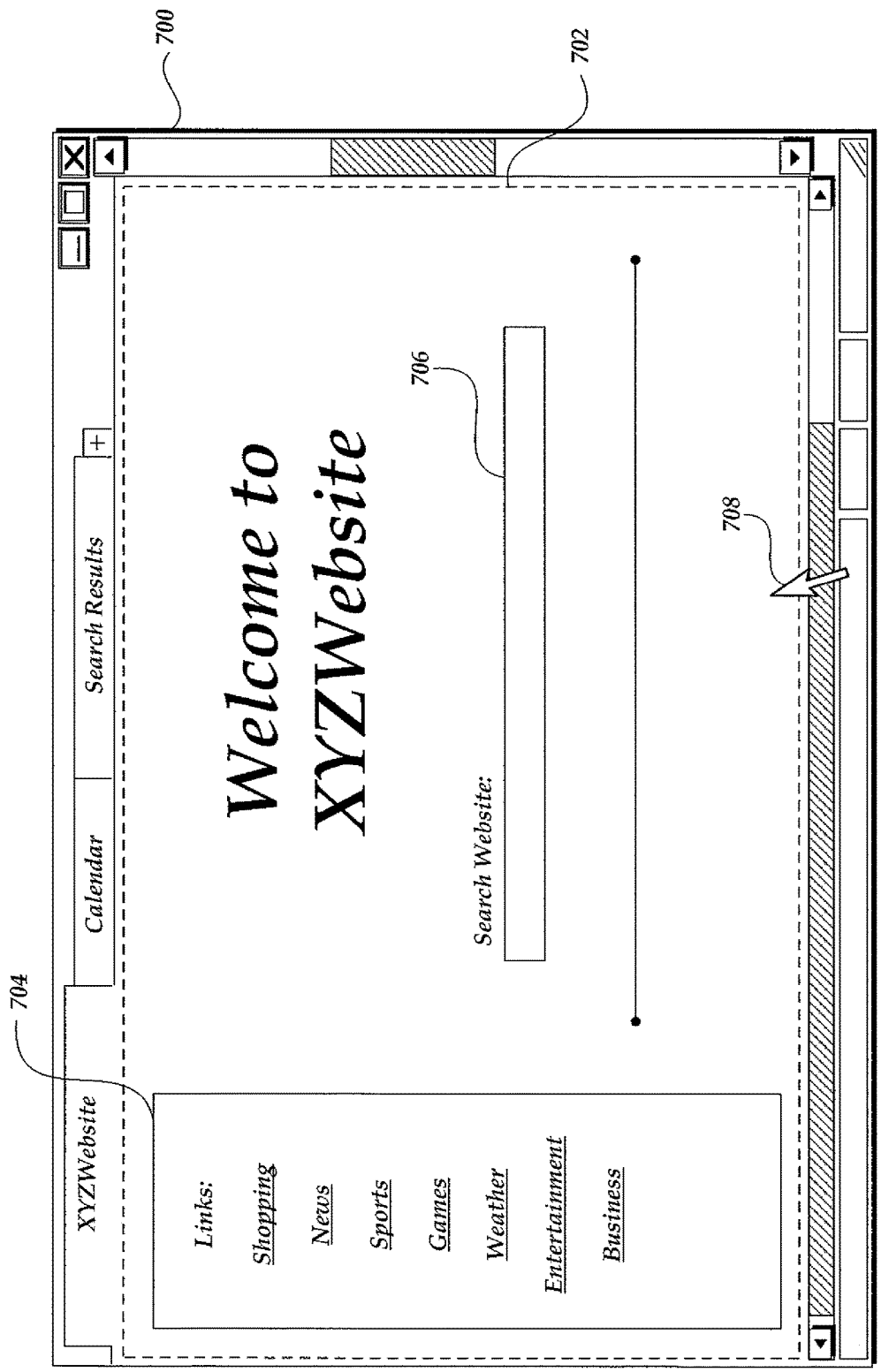
FIG. 7A is a user interface diagram depicting an illustrative browser interface and display of browse session content.

FIG. 7A is a user interface diagram depicting an illustrative browser interface and display of browse session content. As described above with reference to FIG. 5, a browser 700 may have a content display area 702, as well as one or more one or more local interface components. These local interface components may include toolbars, menus, buttons, address bars, scroll bars, window resize controls, or any other user interface controls. Illustratively, local interface components may be displayed as separate from the content display area or may be overlaid or embedded in the content display area. Additionally, the content display area 702 may display interactive controls and other components alongside the content items. The content displayed in FIG. 7A includes a list 704 of links that the user may activate to navigate to linked web pages, and an input box 706. A cursor 708, such as an arrow cursor that might be controlled by a mouse or other pointing input device, is also illustrated below the input box 706.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

Figure 7B:
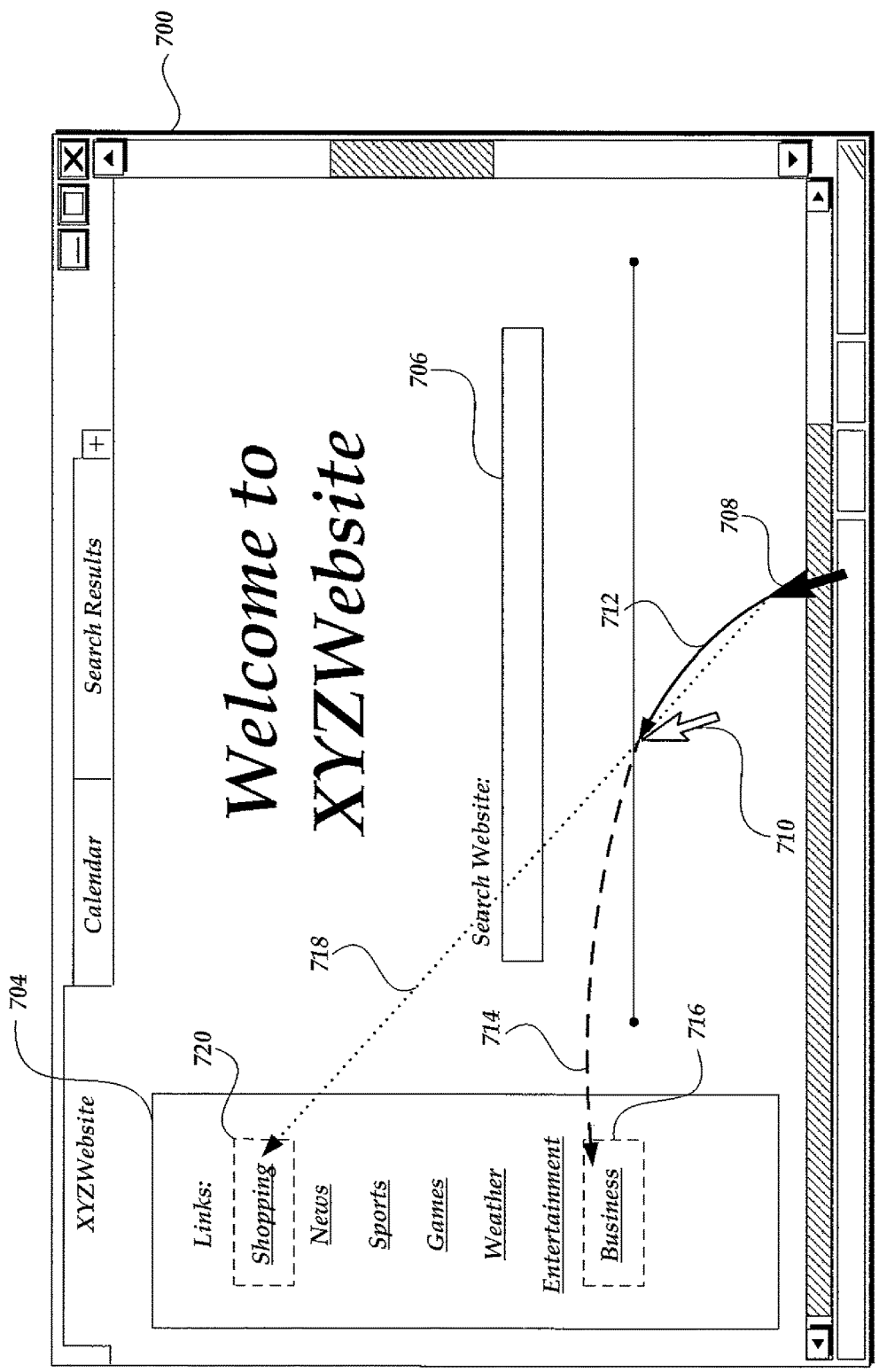
FIG. 7B is the user interface diagram of FIG. 7A depicting a cursor movement and predicted movement paths.

FIG. 7B illustrates cursor movements on the interface 700 of FIG. 7A. Compared to FIG. 7A, the cursor in FIG. 7B is positioned in a new location 710. The original position 708 of the cursor is illustrated for comparison as a black shadow FIG. 7B. The cursor has taken a curved path 712 to its new position 710. The browser 190 or some other component of the client computing device 102 can be configured to determine or predict the destination of the cursor, and then notify the NCC POP 142 that the user may activate a link at the destination location. For example, the browser 190 can be configured to measure or receive measurements of the speed, acceleration, position coordinates, and/or the movement path of the cursor. The browser 190 can use the measurements in order to determine a likelihood that the cursor will end up on a link, and furthermore whether the user will activate the link. Making the determination at the client computing device 102, by the browser 190 or some other component, can provide a performance benefit when compared to making the determination at a separate device, for example at the NCC POP 142. The effects of network latency can be reduced or eliminated when the measurements are taken and the determination or prediction is made at the same device.

FIG. 7B illustrates a likely path 714 for the cursor. The likely path ends on the business link 716 in the list 704. In response to determining that the likelihood of the user activating the business link 716 exceeds a threshold, the browser 190 can notify the NCC POP 142. In the example illustrated in FIG. 7B, the browser 190 has made this determination while the cursor, in its current position 710, has traveled less than half the distance from its original position 708 to the business link 716. In some embodiments, the browser 190 can make the determination after a still shorter path of travel. In some embodiments, the browser 190 may wait a longer period of time, or may wait for the cursor to travel farther towards a potential destination. The browser 190 can take the user's history of cursor movements into consideration, along with the measurements described above, when determining the likelihood that the user will click a link and which link that may be. As illustrated in FIG. 7B, the cursor has traveled a generally curved path 712 from its original position 708 to its new position 710. The user may have a history of moving the cursor in a curved path toward a link prior to clicking it. Accordingly, the browser 190 may determine that the user is likely to continue to move the cursor in a curved path 714. Taking speed, acceleration, deceleration, etc. into consideration, the browser 190 may determine that the cursor will likely end up on the business link 716, or that there is a likelihood exceeding a threshold that the cursor will end up on the business link 716. Tracking historical interactions can result in more accurate determinations. For example, by factoring only the original position 708 and a subsequent position 710, the browser 190 may determine that cursor will travel a straight line 718 and end up on the shopping link 720. As illustrated in FIG. 7B, the shopping link 720 is in a different quadrant of the display than the business link 716.

The browser 190 can store historical interaction data or user interaction profile information on the client computing device 102. Storing the historical interaction data or user interaction profile information on the client computing device 102 can help ensure that a determination of the likelihood that a user will activate a link is based on the specific input device and display type that is currently being used. In some cases, the specific hardware of the client computing device 102 may alter the way the user interacts with the network resource and chooses links to activate. For example, if one client computing device 102, such as a desktop computer, is configured with a mouse, and a second client computing device 102, such as a laptop computer, is configured with a touch pad, the path that the cursor typically travels may be different even though the same user is operating both devices. In such cases, data about how the user manipulates a specific input device may not be useful on client computing devices 102 with a different input device. However, if each client computing device 102 is equipped with a user-facing camera, the way that the user looks at the display and at links prior to activating them may be consistent across client computing devices 102 and input methods. In some embodiments, historical interaction data can be stored at the network computing provider 107, for example in a storage component 146 of NCC POP 142. By storing the historical interaction data at the network computing provider 107, browsers 190 on other client computing devices 102 used by the same user can access the data for use in determining likely link activations.

In some embodiments, the browser 190 may not use historical interaction data to determine where a user may move a cursor. Instead, the browser 190 may use a standard path, such as a straight path 718, a curved path 714, some other path, or an average of several predetermined paths in order to determine where a user may move a cursor. In such cases, the browser 190 may not determine a specific link that is likely to be activated, but rather a region of the display that the cursor will arrive at. For example, the browser may determine that, regardless of whether the user follows a straight path 718 or a curved path 714, the cursor is likely to arrive at the link list 704. The browser 190 can determine which of the links in the list the user is most likely to select, or the browser 190 can transmit a more general notification of the link list 704 to the NCC POP 142, and the NCC POP 142 can then determine which of the links in the list 704 the user is most likely to select. For example, the browser 190 or the NCC POP 142 can determine which link is the most popular, which link the user has selected during a previous browse session, etc.

Figure 7C:
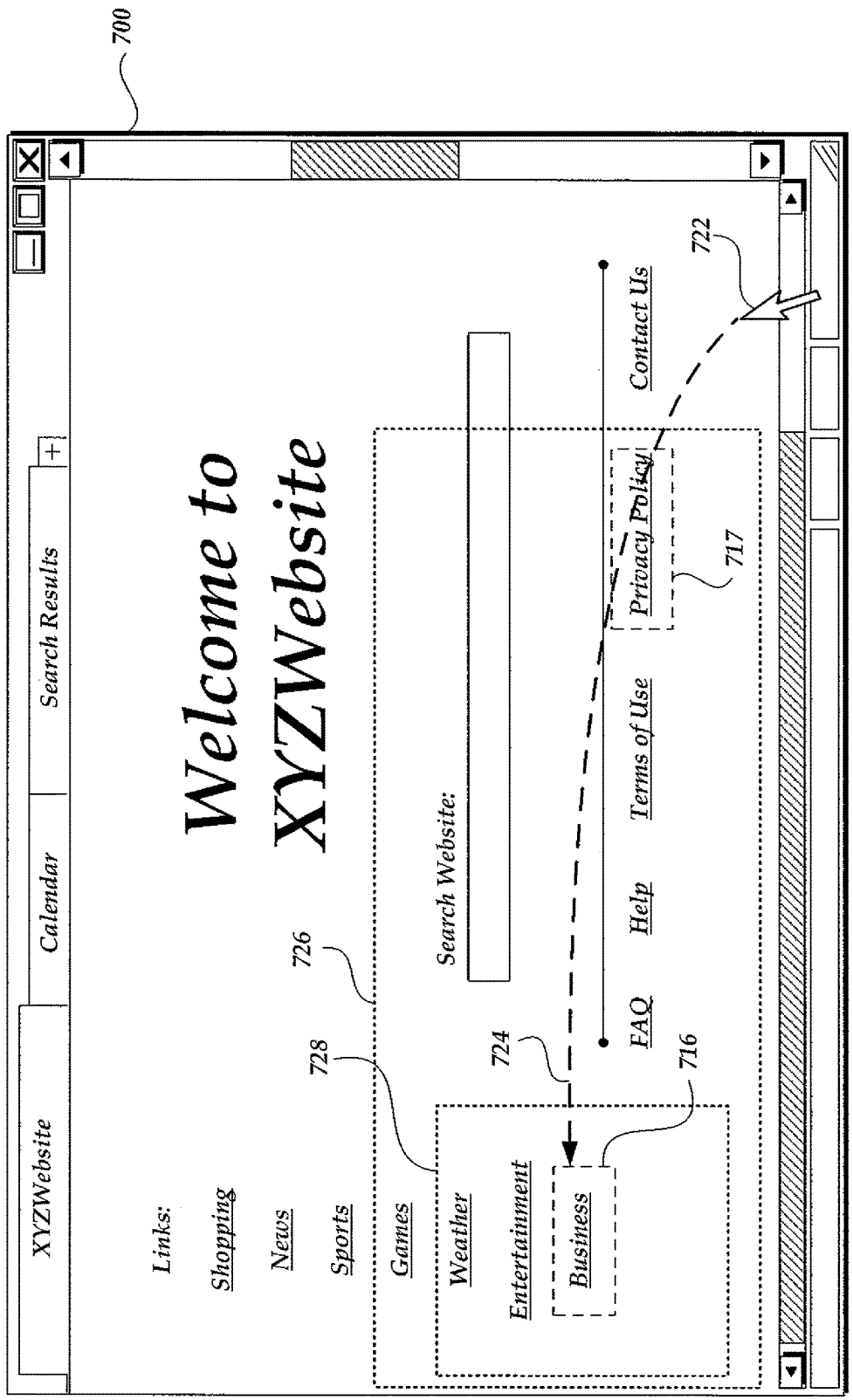
FIG. 7C is the user interface diagram of FIG. 7A depicting a cursor movement and predicted movement paths in relation to regions of the displayed network resource.

FIG. 7C illustrates another example cursor movement path 724. The web page illustrated in FIG. 7C includes several links arranged horizontally near the bottom of the interface 700, in addition to the links arranged vertically as illustrated in FIGS. 7A and 7B. In some embodiments, the browser 190 may notify the NCC POP 142 not only of the likely destination link 716, as described above, but also of the likely path 724 of the cursor 722. Alternatively, the browser 190 may notify the NCC POP 142 of an intermediate link 717, or multiple intermediate links, which may be located in or around the likely cursor movement path 724 between the cursor 722 and likely destination 716. For example, the browser 190 may notify the NCC POP 142 that the cursor is likely to end up on or near the same destination link 716 described above, and also that the cursor is also likely to pass over an intermediate link 717 on the way to the destination link 716.

In some embodiments, the browser 190 may utilize one or more logical regions 726, 728 of the display to determine which link or links users are likely to activate. For example, when a user initiates movement of the cursor 722 along the path 724, the browser 190 can determine that there is a likelihood exceeding a threshold that the user will activate a link within the large region 726, including the links 716, 717 described above and any other links within the region 726. The client computing device 102 can transmit a notification to the NCC POP 142 including network addresses for each of the links within the region 726, coordinates of the region 726, or some other identifier of the links or the region 726. The notification can be triggered in response to the cursor crossing the perimeter of the region 726 and entering the region 726. In some embodiments, the notification can be triggered prior to cursor crossing the perimeter of the region 726, such as in response to the cursor decelerating as it approaches the perimeter of the region 726.

After the cursor 722 travels along the path 724, the browser 190 has more data about the cursor movement and can fine tune its determination of the likely destination. For example, after the cursor 722 travels a distance through the region 726, the browser may determine that there is an increased likelihood that the destination of the cursor 722 will be within a second region 728, which is illustrated in FIG. 7C as a sub-region of the original region 726. The second region 728 need not always be within the original region 726. For example, measurements available to the browser 190 may indicate that the cursor 722 is likely headed to a region partially or wholly outside of the originally determined region 726. Additionally, the second region 728 need not be smaller than the originally determined region 726. For example, the observed path of the cursor may deviate from the path 724 that was originally determined to be the likely path. In such a case, the browser 190 can determine a second region 728 which may be smaller or larger than the original region 726.

In response to receiving any of the notifications described above with respect to FIGS. 7B and 7C, the NCC POP 142 can retrieve and process one or more likely network resources or one or more prioritized embedded resources, as described above. For example, the NCC POP 142 may receive a notification from a client computing device 102 that there is a likelihood exceeding a threshold that a user will activate a specific link. The notification can include a request for the linked network resource. In response to receiving a notification, the NCC POP 142 can retrieve and process the linked network resource or a prioritized embedded resource if it has not already done so. The linked network resource, or a prioritized embedded resource thereof, can then be transmitted to the client computing device 102 if the notification includes a request for it or if the NCC POP 142 is configured to respond to such notifications by transmitting the linked resource regardless of whether there is a specific request made.

In another example, the NCC POP 142 may receive a notification that a user has initiated a cursor movement likely to end in a region containing several links. The NCC POP 142 can retrieve, process, and possibly transmit the linked network resources, or prioritized embedded resources associated with the linked network resources, to the client computing device 102 before any linked network resource is requested. In some cases, the determination of whether to transmit multiple resources can be determined dynamically. For example, if the client computing device 102 has a wired or unlimited wireless connection, such as a WiFi connection, then some or all of the linked network resources in the likely region can be transmitted to the client computing device 102. If the client computing device 102 has a slow network connection or a pay-per-unit data plan, as is the case with many mobile 3G and 4G networks, only the network resource most likely to be requested can be transmitted, or all of the network resources can be held at the NCC POP 142 until a request is actually made.

In some embodiments, the notification to the NCC POP 142 need not specify that the user has initiated a cursor movement likely to end on a specific link or in a region containing links. Rather, the notification may include a request to prefetch or cache a linked resource without any indication of why. In some embodiments, the likelihood determinations need not be made by the browser 190. For example, a separate module or component of the client computing device 102 can receive data regarding user inputs and the position of the links on the client computing device's 102 display. The component can determine the likelihood that the user will activate one or more of the links.

Figure 7D:
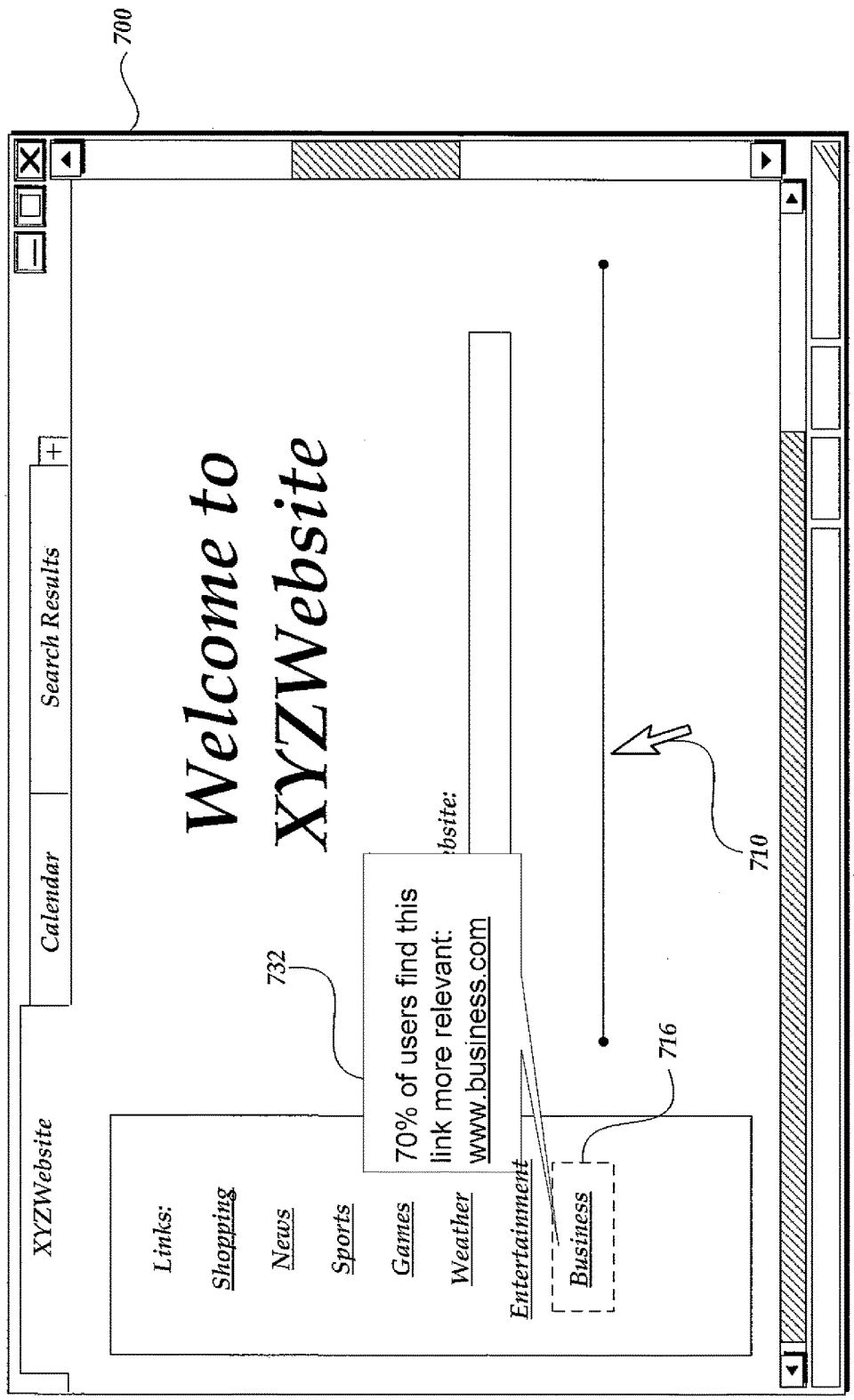
FIG. 7D is the user interface diagram of FIG. 7A depicting a visual effect with information about a linked network resource.
Figure 7E:
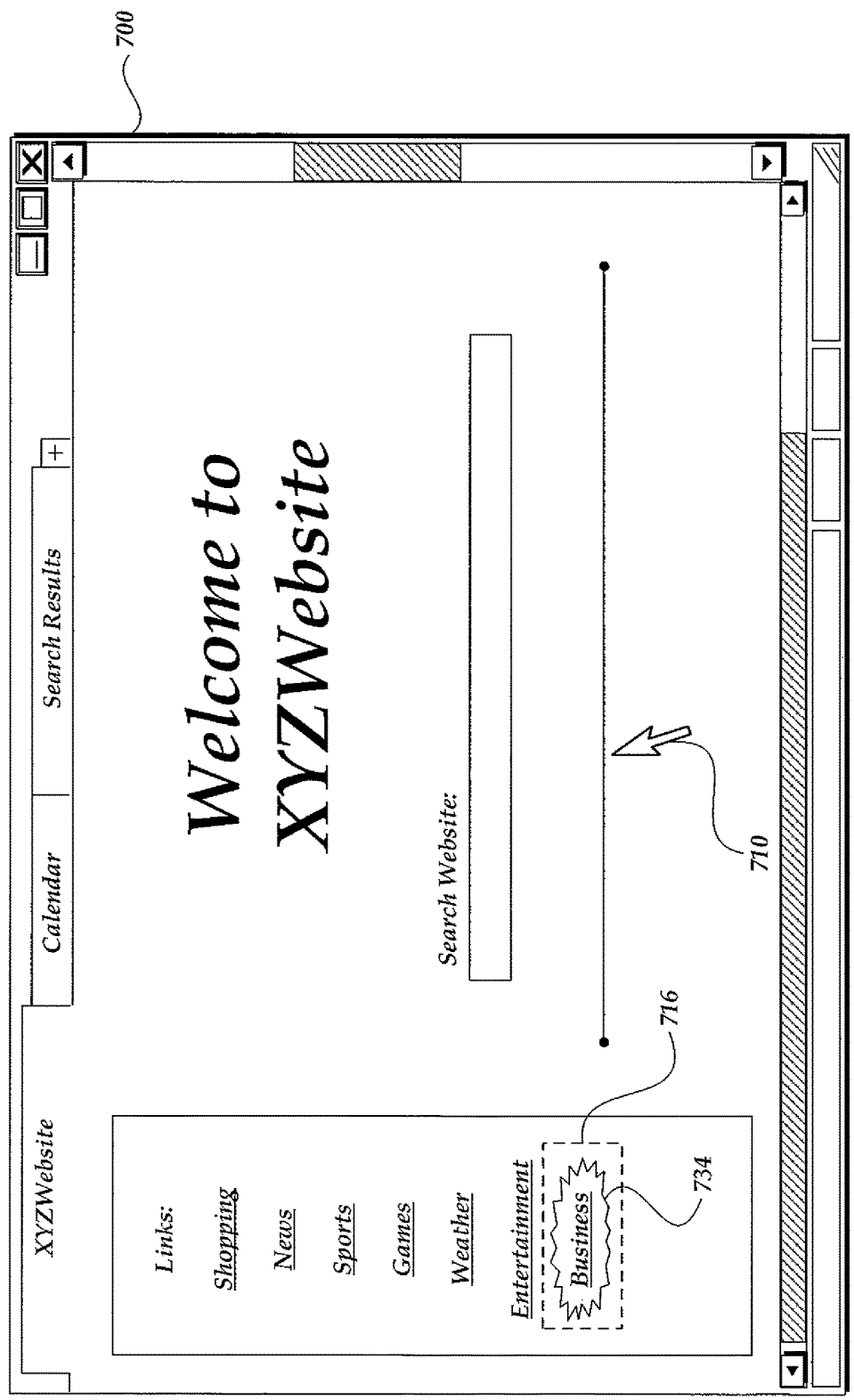
FIG. 7E is the user interface diagram of FIG. 7A depicting an alternate visual effect around a link.

FIG. 7D illustrates an example of a visual effect displayed prior to a user activating a link. The visual effect illustrated in FIG. 7D is hovering message 732 associated with the link 716 that is likely to be activated, or that has a likelihood exceeding a threshold of being activated. For example, after transmitting a notification to the NCC POP 142 that there is a likelihood exceeding a threshold that the user will activate the business link 716, the NCC POP 142 can respond with information about the target of the link. In cases where the client computing device 102 has a high speed connection to the NCC POP 142, the browser 190 can display a message 732 in response to receiving the information before the cursor reaches the link 716. Therefore, the user can be provided with information about the target of the link before activating the link, potentially saving time or improving the overall user experience. For example, the message 732 can inform the user that the web page associated with the link may not be the best source of information for the user, and the message 732 can also include a link to a web page that may be more relevant. In some embodiments, the message can contain other information instead of, or in addition to, the example illustrated in FIG. 7D, such as an indication that the link is present in local cache, a textual description of the target web page, a popularity rank or value for the target web page, user ratings of the target web page, an image of the target web page, a warning that the content at the target web page may not be appropriate, etc. The popularity value can be based on a group of users, such as all users within the United States, or all users who are social network contacts of the current user. The popularity value can be numerical, such as an overall rank of target page among some group of pages. The popularity value can also be displayed graphically, such as with an icon. The visual effect need not be a hovering message 732. In some embodiments, the browser 190 can alter the appearance of the link to represent a characteristic of the target site in response to receiving data from the NCC POP 142. FIG. 7E illustrates the application of a sample visual treatment to a likely destination link. The destination link 716 in FIG. 7E has a sparkle or animated effect 734 applied to it. Alternatively, the text of the destination link 716 can be altered, such as by changing its font type, font size, or color. The alteration can draw the attention of the user to the link, and can also communicate some specific information associated with the link. For example, the browser 190 can outline the link in red if it determines that a statistically significant number of users have found the target web page objectionable or otherwise unhelpful. The display of visual effects can be configured by the user and/or toggled on and off automatically based on, among other things, the content of the requested web page. For example, if the requested web page contains the results of a search, visual effects can be displayed by default because the user is likely to activate a link. If the requested web page contains a news article, the visual effects can be disabled or otherwise hidden because the user is more likely to read the content of the requested web page, and the automatic display of messages when a user moves the cursor or looks around the display may be distracting.

The browser 190 can utilize the same techniques as described above with respect to FIGS. 7B and 7C for determining which link the user is likely to activate, and for determining which notification to send to the NCC POP 142. In some embodiments, information about the links and visual effects can be received with the network resource, shortly thereafter, or during periods in which the network connection of the client computing device 102 is idle. This can eliminate the need to send notifications to the NCC POP 142 in order to receive information and visual effects. Instead, the information can be present in the browser 190 and immediately available for display in response to a determination that a user is likely to activate a link.

Figure 8:
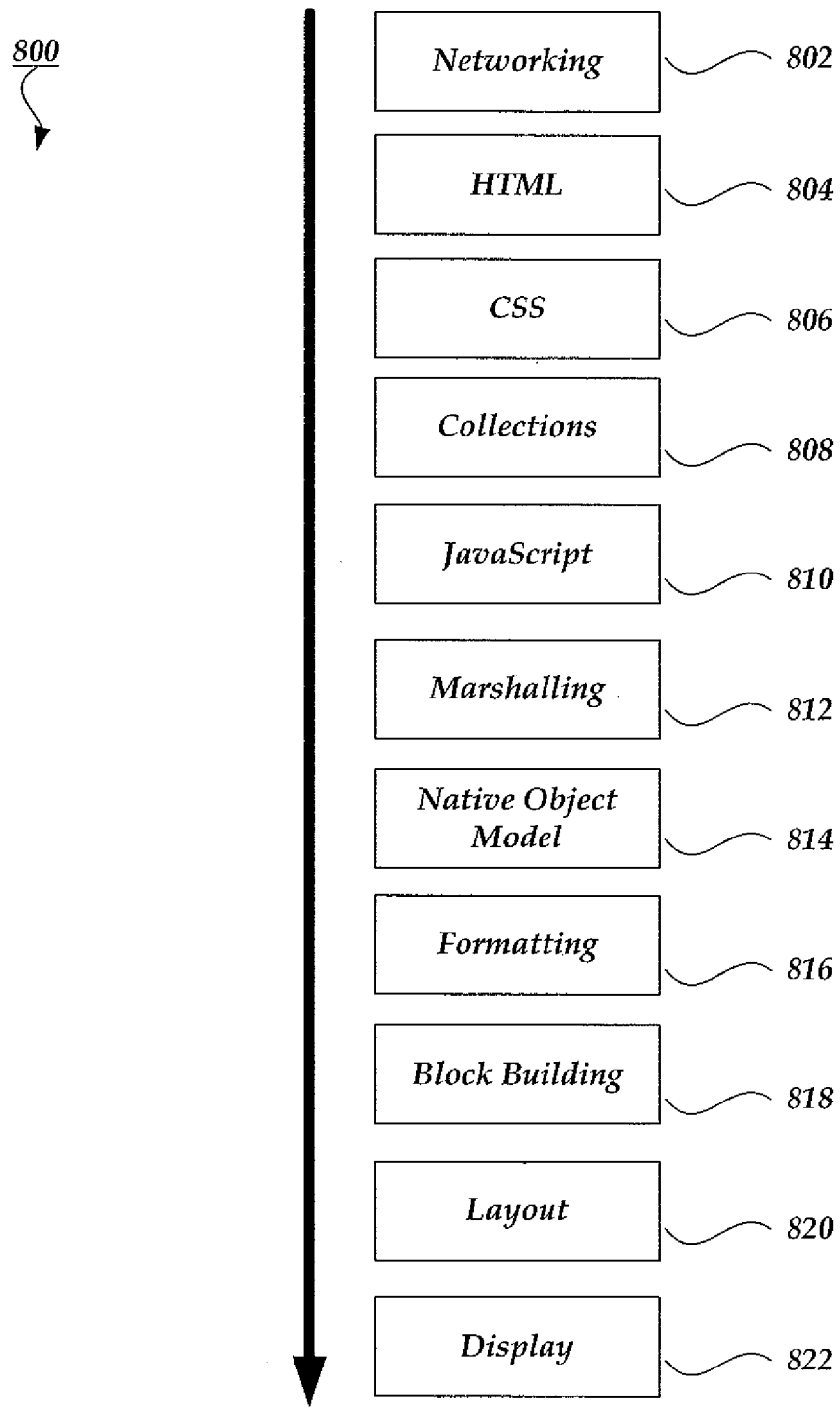
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions. Illustratively, and as described above with reference to FIGS. 3-5, a remote session browsing configuration may specify a split between processing actions performed at a network computing provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of web pages or other web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing provider 107.

Illustratively, the first processing subsystem involved in the processing and display of network content is the networking subsystem 802. Illustratively, the networking subsystem 802 may be responsible for all communication between the browser and content provider, including local caching of Web content. The networking subsystem is generally limited by the performance of the user's network. A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When JavaScript is encountered, it may be passed directly to a JavaScript subsystem 810 responsible for executing the script. The JavaScript subsystem 810 has been examined fully over the years, and may be one of the most well known browser subsystems in the art. A remote session browsing configuration that splits processing actions at a JavaScript subsystem 810 may construct a processing result including an internal representation of one or more JavaScript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshalling subsystem 812 between the browser and the script engine. Passing information through this communication layer may generally be referred to as marshaling. A remote session browsing configuration that splits processing actions at a marshalling subsystem 812 may construct a processing result including marshalling data as well as any other processed structures, scripts, or data discussed above, and provide the processing result and associated embedded resources to the client computing device for processing.

In some embodiments, JavaScript interacts with an underlying network resource such as a Web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem 814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Figure 9:
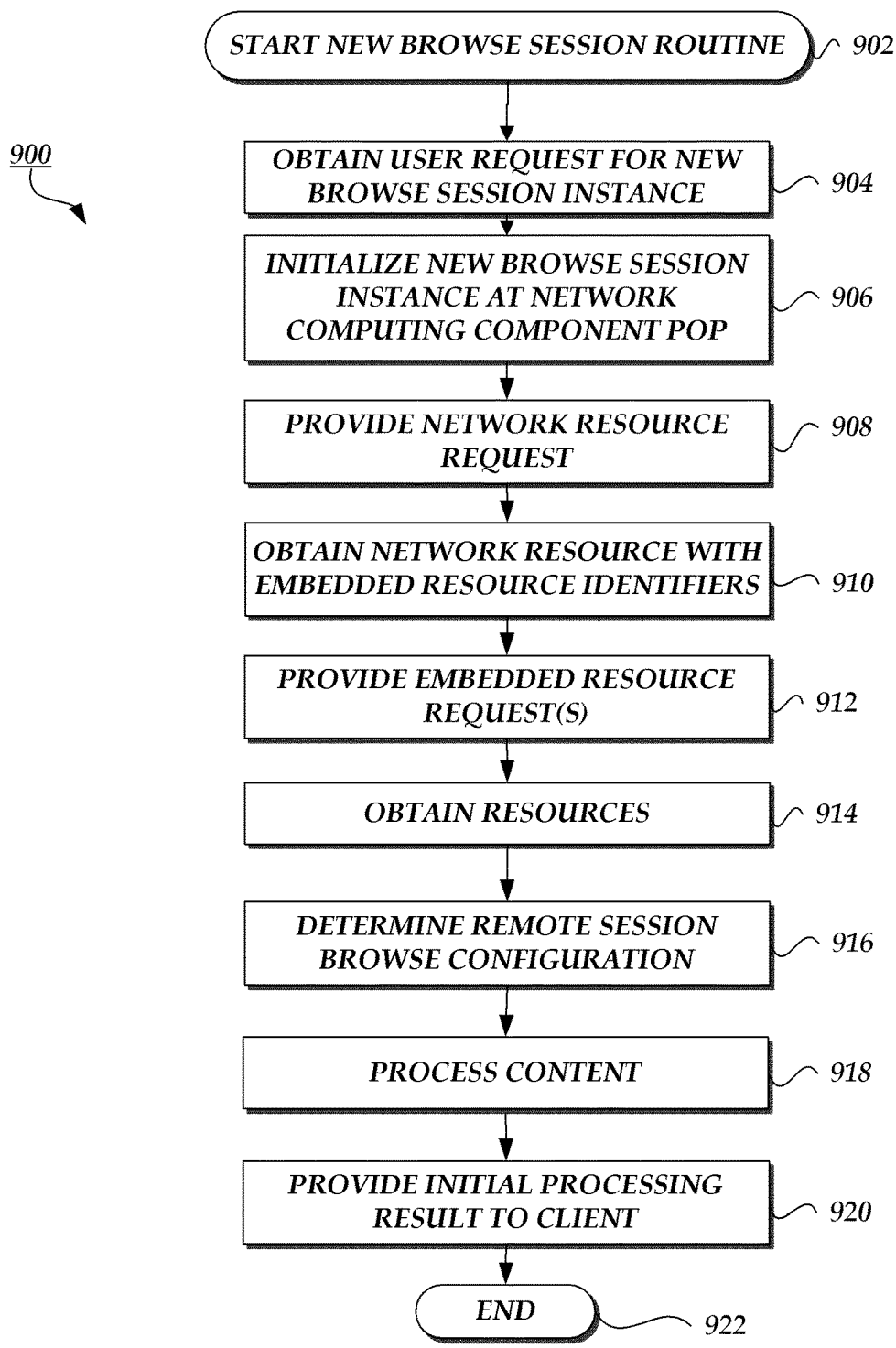
FIG. 9 is a flow diagram illustrative of a new browse session routine implemented by network computing provider.

FIG. 9 is a flow diagram illustrative of a new browse session routine 900 implemented by network computing provider 107 of FIG. 1A. New browse session routine 900 begins at block 902. At block 904, the network computing provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing provider 107 may select an associated NCC POP to instantiate a new browse session based on the browse session request. As discussed above with reference to FIG. 1A, a network computing provider 107 may include any number of NCC POPs distributed across any number of physical or logical locations. A network computing provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing provider 107 may select a number of NCC POPs to service a browse session request. For example, the network computing provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing provider 107, NCC POP 142 may obtain the browse session request. In one embodiment, NCC POP 142 may have the browse session request forwarded to it by a component of network computing provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing provider 107, may be provided with a subset of information (e.g., just a network address of requested content), or may be provided additional information not included in the original browse session request.

Subsequent to the NCC POP 142 being selected, the network computing provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing provider or NCC POP 142 may instantiate any number of new virtual machine instances and/or browser instances (or make use of existing instantiated instances) based on a single browse session request.

At block 908 the network computing provider 107 may provide a request for one or more network resources to a content provider or CDN service provider based on a network address included in the browse session request. In various embodiments, one or more network resources may be additionally or alternately retrieved from a cache local to the NCC POP 142 or otherwise associated with the network computing provider 107. One of skill in the art will appreciate that, in the case of other embodiments, the link or network address may correspond to a document or file stored in a digital file locker or other network storage location or at a cache component associated with the network computing provider 107 or client computing device 102. In some embodiments, the new session request may include a document or file in addition to or as an alternative to a network address. At block 910, the network computing provider 107 obtains the one or more network resources. Subsequent to obtaining the requested network resource, the NCC POP 142 may process the network resource to extract embedded resource identifiers.

At block 912, the network computing provider 107 may provide resource requests to one or more sources of content such as content providers, CDN service providers, and caches. The resource requests may correspond to embedded resources based on the one or more embedded resource identifiers extracted from the one or more network resource as described in block 910 above. At block 914, the network computing provider 107 may obtain these embedded resources from any number of different sources, sequentially or in parallel.

At block 916, the network computing provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., web pages, video, Flash documents) may require various processing actions before being displayed on a computing device. A web page, for example, may be parsed to process various HTML layout information and references to associated resources or embedded content such as CSS style sheets and JavaScript, as well as embedded content objects such as images, video, audio, etc. The HTML and each referenced object or piece of code will typically be parsed and processed before a representative object model corresponding to the web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that various of the processing actions required for display of piece of network content be performed at the remote computing device, such as the NCC POP 142, rather than at the client computing device 102. Network content partially (or wholly) processed at the network computing provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 142 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, JavaScript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing Web sites with extensive processing requirements may automatically be assigned a remote session browsing configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular Web site, network domain, or set of related resources. A content provider that historically has provided video-heavy web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time, or after the NCC POP 142 has identified or determined a change in the content being served by the content provider.

In other embodiments, a network resource, Web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or JavaScript information defining page layout). The NCC POP 142 may therefore select a remote session browsing configuration that performs a substantial amount of processing at the network computing provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing provider 107. The remote session communication protocol may thus achieve smaller delays and smoother presentation when presented with simple network content that requires very little processing or network content that requires rapid change in displayed content after its initial load. For example, a web page with embedded video may perform better performing the majority of processing locally and utilizing HTML rather than RDP as a remote session communication protocol. A remote session browsing configuration specifying extensive processing at the network computing provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a web page. The NCC POP 142 may thus process the web page together with all embedded content based on the selected remote browsing session protocol, and utilize the remote browsing session protocol to exchange user interaction data and updated browse session data for all embedded content associated with the web page. In another embodiment, the NCC POP 142 may select different remote session browsing configurations for one or more resources in a set of network content. For example, a network resource such as a web page may reference processing intensive embedded JavaScript or CSS resources, as well as embedded video resources. The NCC POP 142 may select a first remote session browsing configuration for the web page and all embedded resources excluding the embedded video resource, and a second remote session browsing configuration for the embedded video resource. Illustratively, this may result in the NCC POP 142 utilizing RDP to send a processing result to the client computing device 102 for display of the web page and associated embedded resources, while utilizing HTTP to send the embedded video as a separate, unprocessed file. In one embodiment, the client computing device 102 may perform the minimal processing required to display the RDP processing result corresponding to the web page and embedded resources, and may also perform additional processing necessary to display the embedded video, for example, overlaying the video on top of the displayed RDP representation of the web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instance executing at an NCC POP 142. In another embodiment, a client computing device 102 may be provided with unprocessed network resources by the NCC POP 142. Illustratively, the network resources may have been retrieved from one or more content providers, CDNs, or cache components by the NCC POP 142. The resources may be provided to the client computing device 102 to process locally in parallel with the remote browse instance executing at the NCC POP 142. In still further embodiments, the network computing provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIGS. 5 and 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a web page corresponding to a processing result from the NCC POP 142 (e.g., RDP display information representing the rendered page) until the browser is finished processing and rendering the web page locally. The browser may then replace the representation from the NCC POP 142 with the locally rendered representation of the web page. Illustratively, replacing one representation with another representation may be transparent to the user. For example, the local and NCC POP 142 representations of the web page may be identical or substantially identical. In one embodiment, when the NCC POP 142 representation of the web page is displayed, the browser may send various user interactions with the displayed page to the NCC POP 142 for processing. When the locally rendered version of the web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing component 107 may select between a remote and local browse session based on any of the factors enumerated with regards to determining a remote session browse protocol above In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content. In some embodiments, the client computing device 102 may display and process user interactions through whichever browse session, local or remote, loads the requested content first.

In various other embodiments, the network computing provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing provider 107 may instantiate a browse session instance running on a first NCC POP and utilizing an RDP protocol as well as browse session instance running on a second NCC POP utilizing an X-Windows protocol. The client computing device 102 or the network computing provider 107 may determine which browse session instance and protocol should be used based on performance or resource usage considerations as described with regards to determining a remote session browse protocol above.

With continued reference to FIG. 9, at block 918, the network computing provider 107 may process the obtained content, including the one or more requested network resources and embedded network resources, according to the determined remote session browsing configuration to generate an initial processing result. At block 920, the network computing provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
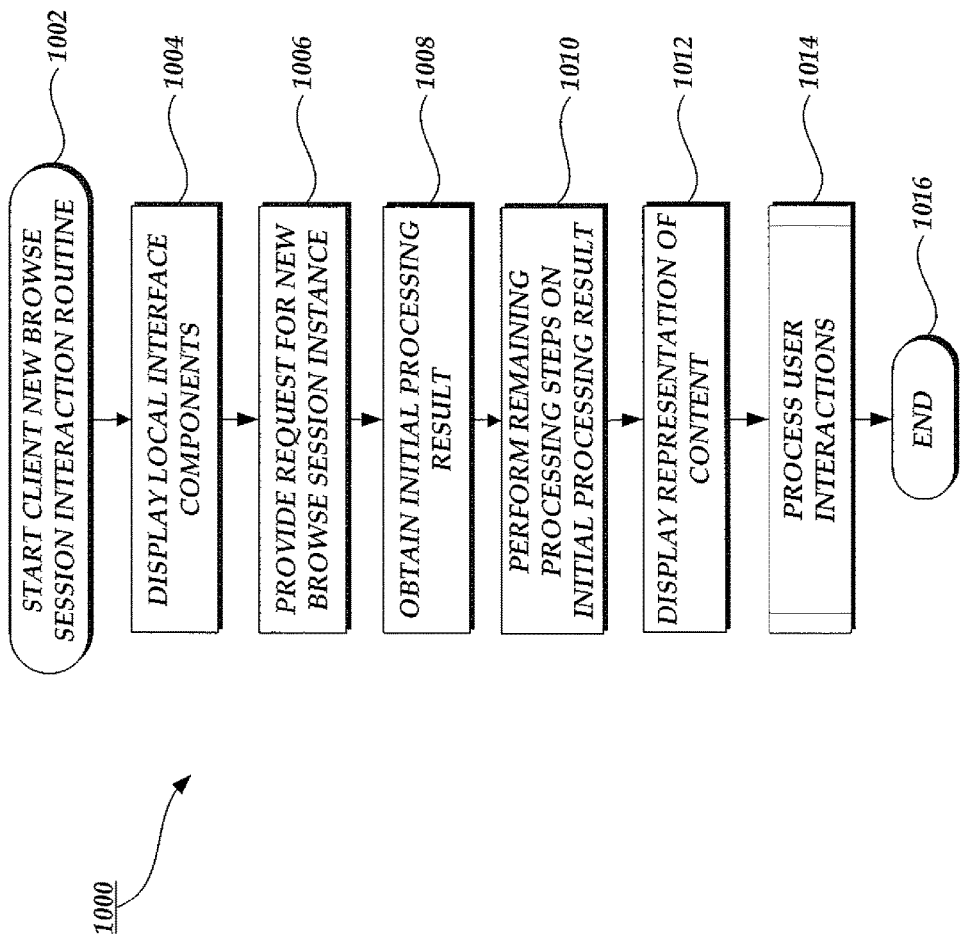
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5 and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing provider 107. From the perspective of the user of the client computing device, the request for the new browse session corresponds to the intended request to transmit the request to one or more corresponding content providers 104. In other embodiment, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2, the browse session request is transmitted first to a network computing provider 107. In an illustrative embodiment, the network computing provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing provider receiving a request for a new browse session instance at block 904 of FIG. 9 above.

At block 1008, the client computing device 102 obtains an initial processing result from the network computing provider 107. Illustratively, the format and data included in the initial processing result may vary based on the remote session browsing configuration selected by the network computing provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7A above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a web page and associated content for display via RDP in a browser instance running in a virtual machine instance at the NCC POP 142. The browser instance may have one or more interface elements such as toolbars, menus, scroll bars, etc., in addition to the displayed web page. The NCC POP 142 may send an RDP processing result corresponding to the displayed web page only, without any of the interface elements associated with the browser. Illustratively, including an RDP processing result corresponding to the displayed web page only may allow the browser at the client computing instance 102 to display the web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out but has associated content still displayed in a browser at the client computing device 102, later attempts by the user to interact with the content may result in a new browse session request being provided to the network computing service provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
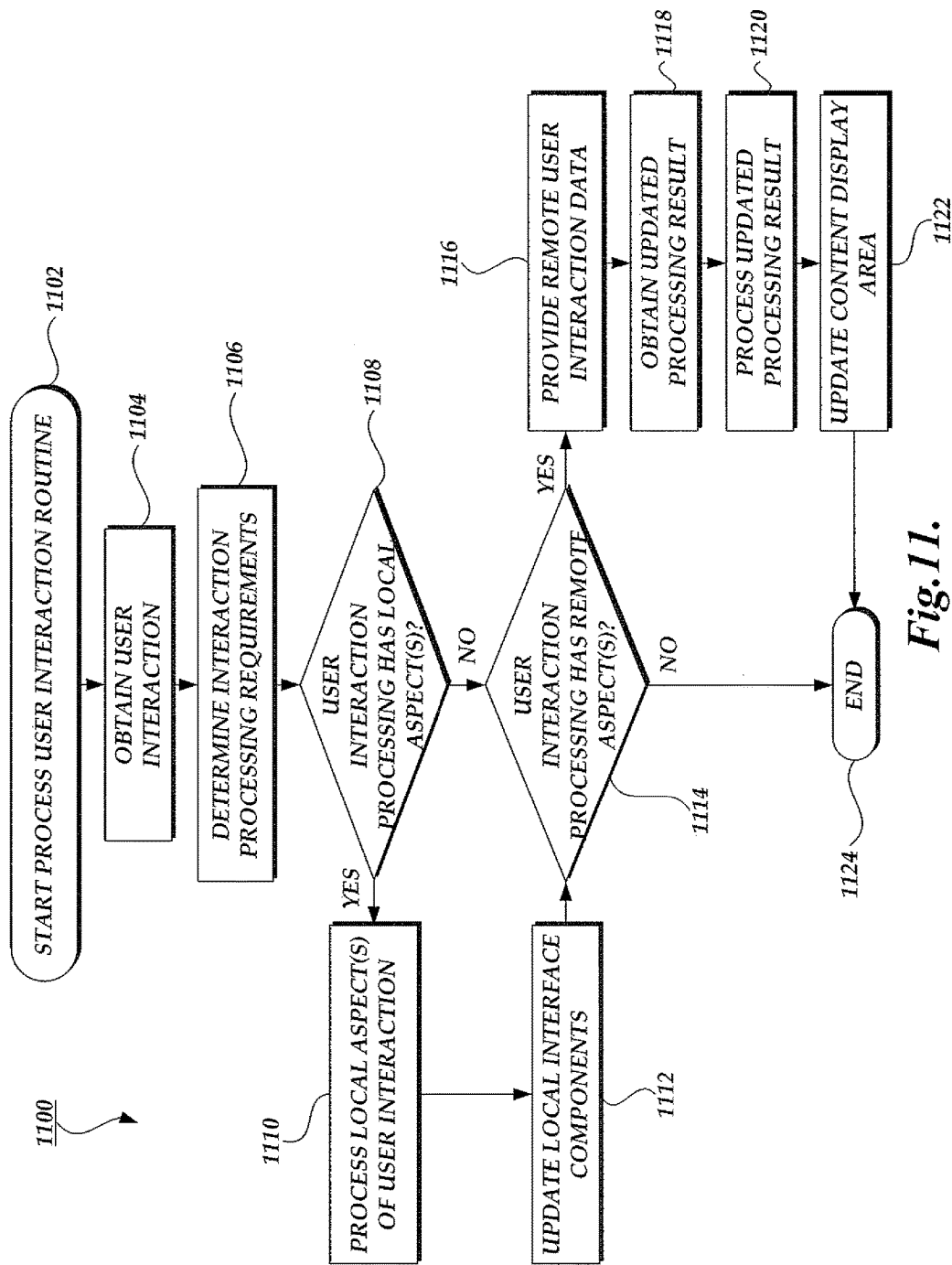
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a web page may require processing and may change the configuration or visual appearance of the web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7A. For example, some local interface components may be managed locally by browser code running on the client computing device, while other local interface components may have one or more locally managed aspects (e.g., button click feedback, scroll bar redraw, etc), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7A and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7A and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1102 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browsing configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing provider 107. Illustratively, in the case of a heavily server side remote session browsing configuration utilizing an RDP remote session communication protocol, the remote user interaction data may include input data such as a cursor position or keyboard input encapsulated in one or more RDP protocol data units. In some embodiments of remote session browsing configurations utilizing RDP or other remote session communication protocols, particular aspects of remote user interaction data such as cursor positions may be provided to the network computing provider 107 on a continuous basis, while in other embodiments of remote session browse configurations remote user interaction data may only be provided to the network computing provider 107 when associated with a user interaction that requires remote processing.

At block 1118, the client computing device 102 obtains an updated processing result from the network computing provider 107, the network computing provider 107 having processed the remote user interaction data to generate an updated representation of the content. At block 1120, the client computing device 102 performs any additional processing required on the updated processing result (based on the remote session browsing configuration) and at block 1122 displays the updated processing result in the content display area of the browser. At block 1124 the process user interaction routine 1102 ends. Illustratively, the routine may be executed again any number of times in response to further user interactions with the browser and displayed content.

Figure 12:
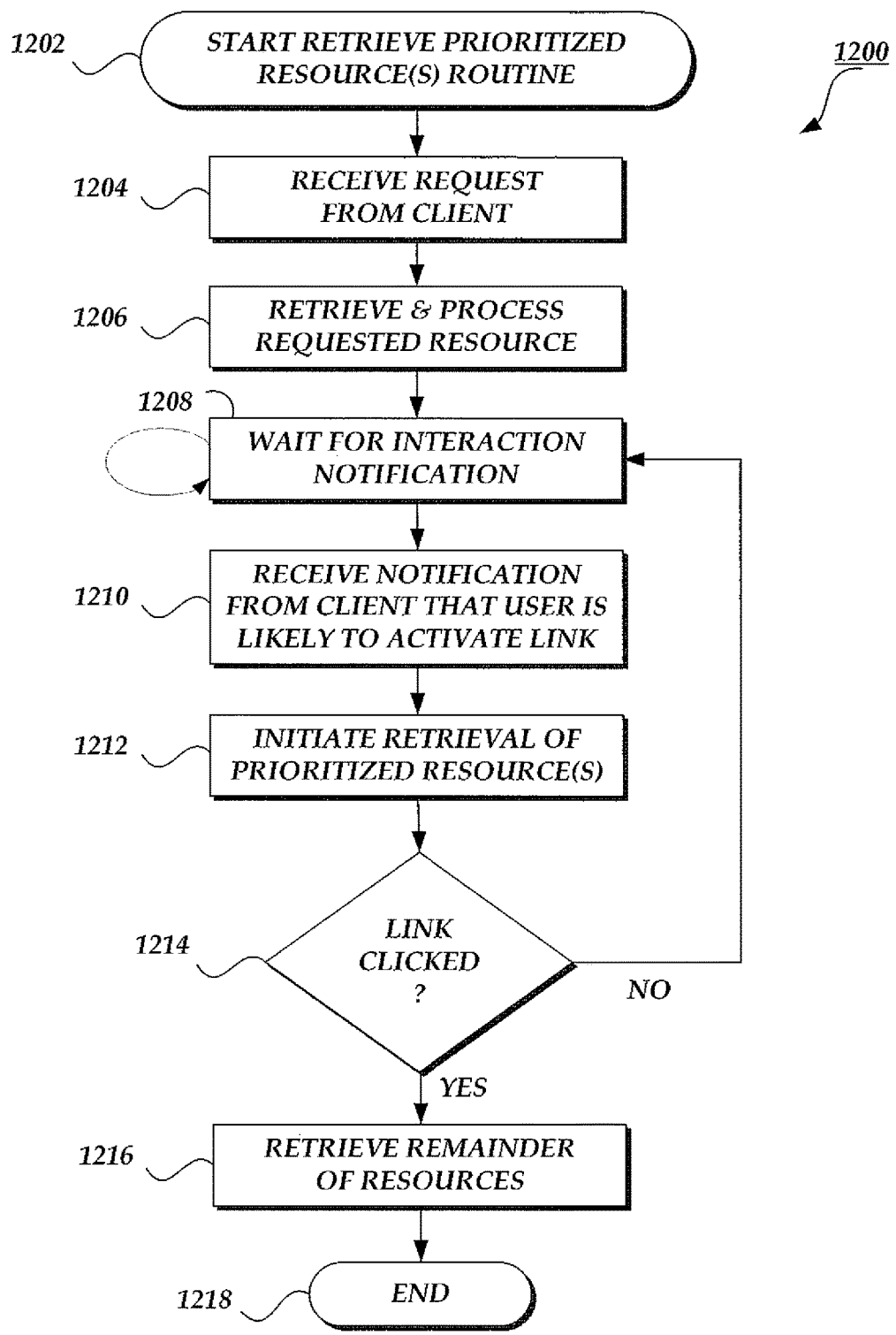
FIG. 12 is a flow diagram illustrative of a retrieve prioritized resource routine implemented by a network computing provider.

FIG. 12 is a flow diagram illustrating an example routine 1200 for retrieving prioritized resources in response to user interactions with a network resource, such as a web page. The routine 1200 can execute on an NCC 144 or some other component of the NCC POP 142. In some embodiments, the routine 1200 or some portion thereof can be implemented by a separate component of the network computing provider 107, or by a third party external to the network computing provider. Alternatively, the routine 1200 or some variant thereof may execute on the client computing device 102. While the description which follows focuses on the retrieval of prioritized resources associated with web pages, the routine 1200 can be extended to other network resources and portions thereof, such as applets and HTML-based email.

The routine 1200 begins at block 1202 and proceeds to block 1204, where the NCC 144 receives a request, from a client computing device 102, for a web page. The request can include a network address of the request web page, as described above.

At block 1206, the NCC 144 can use the received network address to retrieve and process the requested web page. The page can be retrieved from a content source, such as a content provider 104 and/or a CDN service provider 106. The web page or portions thereof may be in the cache 184, and any cached portions can be loaded directly from the cache 184. Processing of the requested web page can occur at a browsing component 182 of the NCC 144, as described in detail above. In particular, the processing can include determining whether the requested web page contains links to other web pages.

At block 1208, the NCC 144 can wait for an interaction notification from the client computing device 102. The NCC 144 can be configured to sleep or otherwise suspend processing until such a notification is received in block 1210, described below. The NCC 144 can alternatively be configured to poll the client computing device 102 for data regarding the interactions of the user. In some embodiments, the routine 1200 can terminate at block 1208. For example, upon retrieving, processing, and transmitting the initial processing result to the client computing device 102 in block 1206 described above, the NCC 144 can terminate the routine 1200. The client computing device 102 can be provided with an API to transmit a notification to the NCC 144 and restart the routine at block 1210. In some cases, the routine 1200 can be implemented as two or more separate routines. For example, a first software module can be configured to execute the processes described above with respect to blocks 1204 and 1206, while a second software module can be configured to execute the processes described below with respect to blocks 1210 through 1216.

At block 1210, the NCC 144 receives a notification, from the client computing device 102, that the user is likely to activate a link or otherwise submit a new request for a web page referenced in the requested web page. The notification may include the network address referenced in the link. In some cases, the notification may include coordinates or a display area that the user is likely to interact with, and the NCC 144 will be responsible for determining which link or links the user may activate.

At block 1212, the NCC 144 can initiate retrieval of one or more prioritized resources. For example, if there is a likelihood exceeding a threshold that a user will access a page that includes an embedded reference to a large image file, the NCC 144 can initiate retrieval of the large image file so that it is ready if the user activates the link. The determination of which resource or resources associated with a linked web page are to be prioritized can be made prior to receiving the notification in block 1210. Data indicating which resources to prioritize can be saved in a storage component 146, as illustrated in FIG. 1B. Upon receiving a notification in block 1210, the NCC 144 can retrieve, at block 1212, the prioritization data 186 associated with the linked web page. In some embodiments, the prioritization of resources can be determined each time the routine 1200 executes.

Prioritization can be based on historical observations of, for example, how long each resource associated with a web page takes to retrieve or how long each resource associated with a page takes to process in the browser component of the NCC 144. In some embodiments, prioritization can be based on an analysis of the embedded references in the web page. Resources referenced by other embedded resources may themselves contain additional references to embedded resources, and so on. For example, if a web page is generally defined by an HTML file that includes an embedded reference to a JavaScript library, the NCC 144 or some other component of the network computing provider 107 can analyze the referenced JavaScript library. The referenced JavaScript library may itself include embedded references to JavaScript libraries, or it may include executable code to load an image file. The image file may not be referenced in the HTML file that generally defines the web page, and therefore a browser following a standard retrieval sequence may not request the image file until all embedded references at higher levels in the reference hierarchy have been requested. The NCC 144 can analyze all of the embedded references in response to prior requests for the web page, and determine that retrieval of the image referenced in the embedded JavaScript library creates a bottleneck. The NCC 144 can store prioritization data 186 for the web page indicating that the image file is the highest priority resource associated with the web page. Therefore, when NCC 144 receives a subsequent notification from a client computing device 102 that the web page may be requested, the NCC 144 can load the prioritization data 186 and initiate retrieval of the image file before the link is activated or the web page is otherwise requested. Initiating retrieval of the image file can consist of saving the image file in the cache 184 of the NCC 144, preloading the image file on the client computing device 102, or causing the client computing device 102 to request the image file from the content source.

At decision block 1214, the NCC 144 can determine whether the link was clicked or the web page was otherwise requested. In some embodiments, the NCC 144 can poll the client computing device 102. In other embodiments, the NCC 144 can wait for a notification from the client computing device 102, or the subsequent blocks of the routine 1200 can be implemented as a separate routine that is initiated in response to the user activating the link. If the user activates the link, the routine 1200 can proceed to block 1216. Otherwise, if the user does not activate the link, or if a predetermined period time passes, the routine 1200 can return to block 1208. In some embodiments, the routine 1200 can return to block 1208 to monitor for additional notifications while at the same time remaining at block 1214 to wait for a notification that the link has been activated.

At block 1216, the NCC 144 has received notification that the user has activated the link, and the NCC 144 can initiate retrieval of the remaining, non-prioritized resources associated with the linked web page. The NCC 144 can also begin processing the resources in an instance of the browsing application 182 if it has not already begun to do so, as described in detail above. In response to completed retrieval and processing of the resources associated with the web page and transmission of the initial processing result to the client computing device 102, the routine 1200 can end at block 1218.

In some embodiments, the client computing device 102 may transmit a notification to the NCC 144 that the user is likely to interact with an resource of the requested web page, rather than activate a link to request a new web page. For example, if a video is embedded into the requested web page, the client computing device 102 may notify the NCC 144 that the user is likely to start the video by activating a button associated with it. In response, the retrieval of a prioritized resource described above can be implemented as causing the client computing device 102 to begin buffering the video so that it is ready for immediate playback. In some embodiments, this process may be performed entirely by the client computing device 102.

Figure 13:
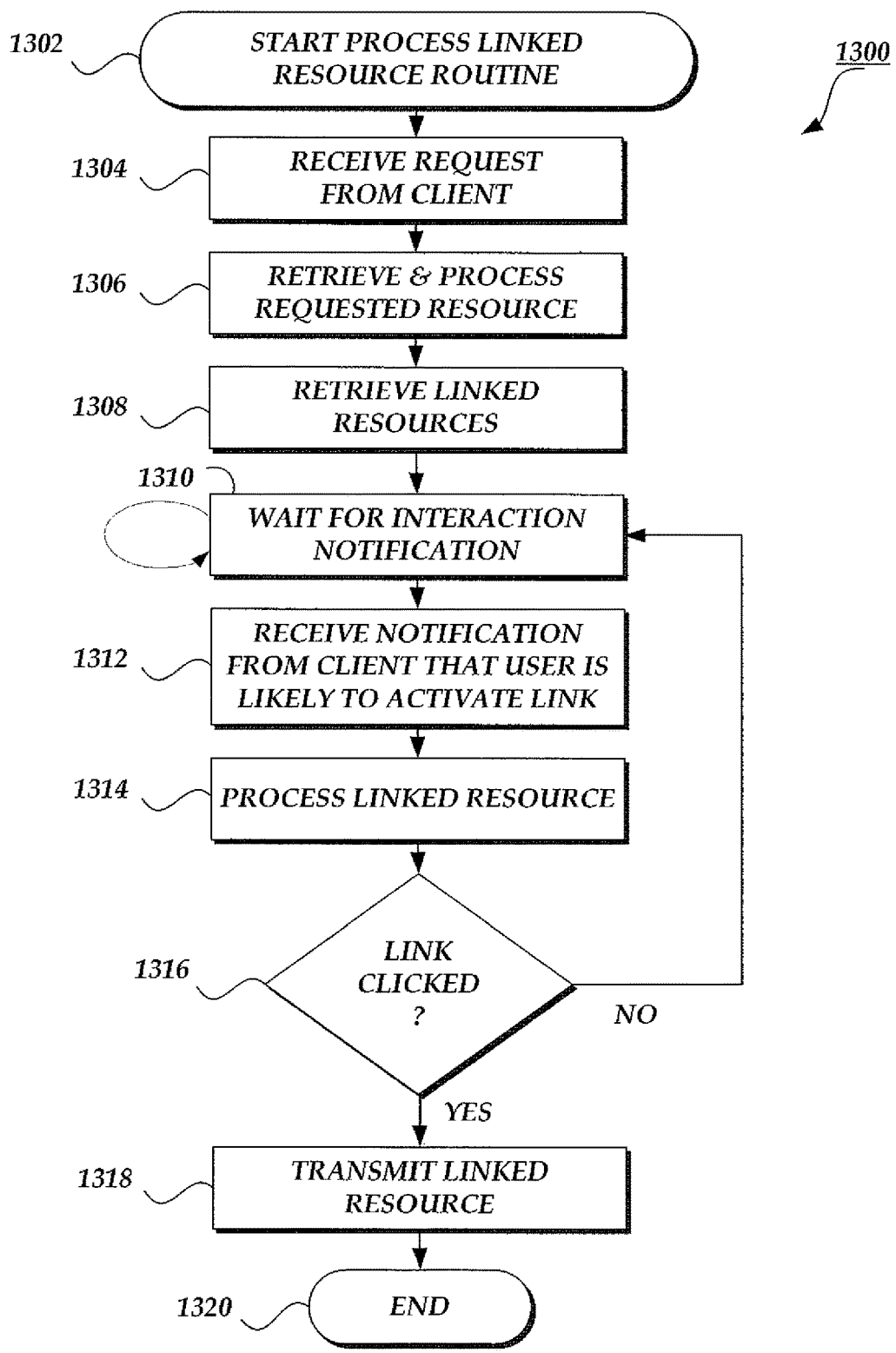
FIG. 13 is a flow diagram illustrative of a process linked resource routine implemented by a network computing provider.

FIG. 13 is a flow diagram illustrating an example routine 1300 for retrieving web pages linked in a requested page prior to receiving a request for the linked web pages, and for initiating processing of the retrieved web pages in response to receiving a notification that there is a likelihood exceeding a threshold that a user will request the page. In a normal sequence of events, a user requests a web page, such as by clicking a link, and the client computing device 102 or a proxy server retrieves the web page and associated resources in response to the request. The user then waits for the web page and associated resources to be retrieved, processed, and rendered on the client computing device 102 before being able to view and interact with the newly requested web page. The routine 1300 can shift the retrieval of some or all resources associated with a web page to the period of time before the user clicks the link to the page or otherwise requests the page. The NCC 144 can retrieve the linked web pages while the user is viewing the requested page. Then, in response to user interactions, the NCC 144 can initiate processing of the retrieved resources, and an initial processing result can be available for immediate transmission to client computing device 102 when the user clicks the link to request page. The routine 1300 can execute on an NCC 144 or some other component of the NCC POP 142. In some embodiments, the routine 1300 or some portion thereof can be implemented by a separate component of the network computing provider 107, or by a third party external to the network computing provider. Alternatively, the routine 1300 or some variant thereof may execute on the client computing device 102.

The routine 1300 begins at block 1302 and proceeds to block 1304, where the NCC 144 receives a request, from a client computing device 102, for a web page. The request can include a network address of the request web page, as described above.

At block 1306, the NCC 144 can use the received network address to retrieve and process the requested web page. The page can be retrieved from a content source, such as a content provider 104 and/or a CDN service provider 106. The web page or portions thereof may be in the cache 184, and any cached portions can be loaded directly from the cache 184. Processing of the requested web page can occur at a browsing component 182 of the NCC 144, as described in detail above. In particular, the processing can include determining whether the requested web page contains links to other web pages.

At block 1308, the NCC 144 can initiate retrieval of some or all of the web pages linked in the requested web page. The retrieval is initiated prior to receiving any request for the linked web page or a determination that there is a likelihood exceeding a threshold that a user may request the web page. By retrieving linked web pages, or portions thereof prior to receiving a request for a linked page, the NCC 144 can reduce latencies involved in responding to subsequent requests for linked web pages. For example, the web page illustrated in FIG. 7A includes a link list 704 containing seven links. The NCC 144 can retrieve the HTML file that defines each of the seven linked web pages, and store the HTML files in a cache 184. In some embodiments, the NCC 144 can initiate retrieval of all associated resources, or any number of prioritized resources as described above with respect to FIG. 12 instead of, or in addition to, to the HTML files.

At block 1310, the NCC 144 can wait for an interaction notification from the client computing device 102. As described above with respect to block 1208 of FIG. 12, the NCC 144 can be configured to sleep or otherwise suspend processing until such a notification is received, or the NCC 144 can be configured to poll the client computing device 102 for data regarding the interactions of the user. Alternatively, the routine 1300 can terminate at block 1310 and then restart at block 1312 upon receipt of a notification from a client computing device 102.

At block 1312, the NCC 144 receives a notification, from the client computing device 102, that the user is likely to activate a link or otherwise submit a new request for a web page referenced in the requested web page. For example, user may initiate a cursor movement toward a link, and the client computing device 102 may transmit, to the NCC 144, the network address referenced in the link. In some cases, the notification may include coordinates or a display area that the user is likely to interact with, and the NCC 144 will be responsible for determining which link or links the user may activate.

At block 1314, the NCC 144 can initiate processing of the linked resource determined, in block 1312, to be associated with a likelihood exceeding a threshold of being requested. Processing of the linked resource can occur at a browser component 182 of the NCC 144, as described in detail above. For example, if the HTML file and any number of associated resources have been previously received in block 1306, those resources can be loaded into the browser component 182 for processing. Additionally, any remaining resources associated with the linked web page can be retrieved and loaded into the browser component 182.

At decision block 1316, the NCC 144 can determine whether the ink was clicked or the web page was otherwise requested. Similar to routine 1200 described above, the NCC 144 can poll the client computing device 102 or wait for a notification from the client computing device 102. If the user activates the link, the routine 1300 can proceed to block 1318. Otherwise, if the user does not activate the link, or if a predetermined period time passes, the routine 1300 can return to block 1310. In some embodiments, the routine 1300 can return to block 1310 to monitor for additional determinations of likely link activations while at the same time remaining at block 1316 to wait for a notification that the link has been activated. For example, the client computing device 102 may transmit a new determination of likely activation of a link to the NCC 144 rather than a notification that the user has activated the previously determined link. If the NCC 144 is monitoring for both types of notifications from the client computing device 102 it can respond properly.

At block 1318, the NCC 144 has received notification that the user has activated the link. In response, the NCC 144 can transmit to the client computing device 102 the initial processing result from the browser component 182. At block 1320, the routine 1300 terminates.

Figure 14:
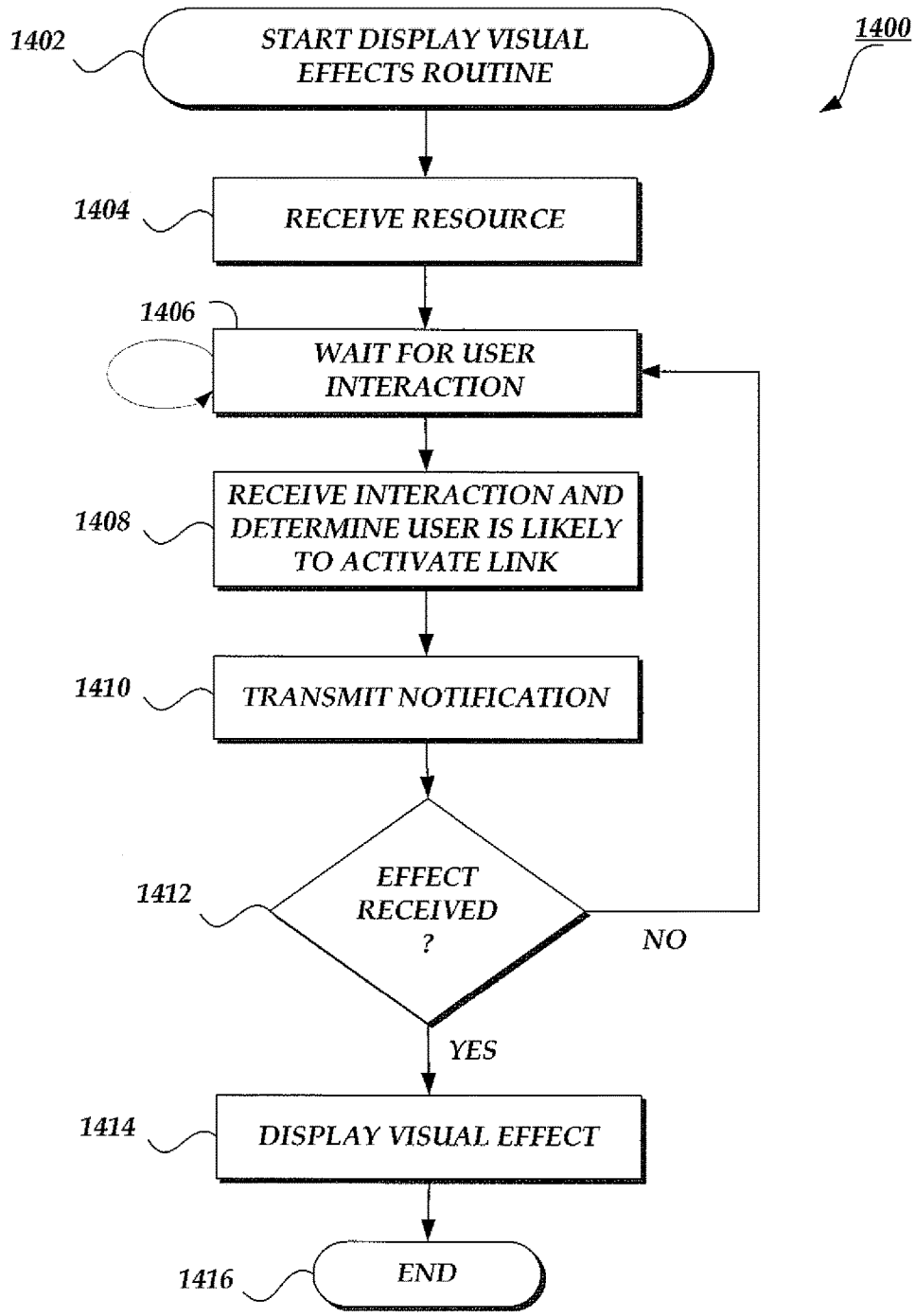
FIG. 14 is a flow diagram illustrative of a display visual effects routine implemented by a client computing device.

FIG. 14 is a flow diagram illustrating an example routine 1400 for receiving information about linked web pages and displaying visual effects in response to receiving the information. The routine 1400 can execute in browser 190 or some other component of a client computing device 102. In some embodiments, the routine 1400 or some portion thereof can be implemented by a component of the NCC POP 142 or some other component of the network computing provider 107.

The routine 1400 begins at block 1402 and proceeds to block 1404, where the client computing device 102 receives a network resource, such as a web page, from the NCC 144. The web page may include one or more links to other web pages.

At block 1406, the client computing device 102 can wait for interactions from the user. Interactions can include movement of a cursor on the display, such as by a mouse or other pointing device. In some embodiments, the client computing device 102 may be configured with a user-facing camera, and interactions can include the user looking at different portions of the display. Similar to the waiting and/or monitoring described above with respect to FIGS. 12 and 13, the browser or some other component of the client computing device 102 can be configured to suspend processing until such interaction is initiated. Alternatively, the routine 1400 can terminate at block 1406 and then restart at block 1312 upon receipt of a notification from a client computing device 102.

At block 1408, the user initiates an interaction with the client computing device 102 and the browser 190 or some other component determines which link, if any, the user may activate. As described above, the interaction may include a cursor movement or an eye movement. In some embodiments, the browser can track or otherwise have access to data describing the interactions in real time or substantially real time. The browser 190 can use a profile of the user's interaction tendencies or historical data about previous interactions of the user to determine likely link that the user may click as a result of the interaction, as described above with respect to FIG. 7B.

At block 1410, the client computing device 102 can transmit a notification to the NCC 144 prior to the user clicking a link to request a web page. The notification can include a network address associated with the link that the user is likely to activate, or which there is a likelihood exceeding a threshold that the user will activate. In some embodiments, other information can be transmitted to the NCC 144, such as screen coordinates or layout tags associated with an area of the screen, rather than a specific link, that the user is likely to interact with.

At decision block 1412, the client computing device 102 can determine whether information has been received from the NCC 144 that the browser 190 can use to display a visual effect regarding the link. If information has been received, the routine 1400 can proceed to block 1414. Otherwise, if no information has been received, the routine 1400 can return to block 1406. In some embodiments, the client computing device 102 can wait for information from the NCC 144 and also monitor for additional user interactions. If a new interaction has been initiated, the routine 1400 can proceed to determine a different link with a likelihood of being activated that exceeds a threshold, as in block 1408.

At block 1414, the client computing device 102 has received information regarding the link from the NCC 144. If the network connection between the client computing device 102 and the NCC 144 is sufficiently fast, the information will be received prior to the user activating the link. Illustratively, a user may take between 100 milliseconds and 1 second to move a cursor to a link. If the user takes 500 milliseconds to move the cursor to a link, and the network connection between the client computing device 102 and the NCC 144 is capable of transmitting messages between the two in 100 milliseconds, there will be 300 milliseconds for the NCC 144 and client computing device 102 to process data and generate a display before the cursor reaches the link.

In response to receiving the information from the NCC 144, the browser 190 can display a visual effect to the user. In some embodiments, the browser 190 can display a message to the user that includes at least a portion of the information received from the NCC 144, such as the message 732 of FIG. 7D. The message may contain a link to a recommended web page, information about other users' interactions with the target web page, etc. In some embodiments, the browser 190 can display other visual effects to the user, such as highlighting or other changes to the link, a preview picture of the target web page to which the link cause the browser 190 to navigate, and the like. In response to displaying the visual effect to the user, the routine 1400 may terminate at block 1416, or it may return to block 1406 to wait for subsequent user interaction if the user did not activate the link.

In some embodiments, the NCC 144 can transmit information about linked web pages to the client computing device 102 before the user initiates a cursor movement or other user interaction toward a link. For example, during the time that the browser 190 is waiting for user interaction in block 1406, the NCC 144 can generate the information and transmit it to the browser 190. This can eliminate the step of the browser 190 transmitting a notification to the NCC 144 that the user may click a link, as described above with respect to block 1410. Instead, the browser 190 can immediately display the visual effect to the user in response to determining that there is a likelihood exceeding a threshold that the user is going to activate a link.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Depending on the embodiment, certain acts, events, or functions of any of the algorithms or program routines described herein can be performed in a different sequence, can be added, merged, or left out all together (e.g., not all described acts or events are necessary for the practice of the routine). Moreover, in certain embodiments, acts or events can be performed concurrently, e.g., through multi-threaded processing, interrupt processing, or multiple processors or processor cores or on other parallel architectures, rather than sequentially.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for retrieval of prioritized resources, the system comprising:
   a network computing component comprising an executable software module in a memory, the executable software module executed by one or more computer processors, wherein the network computing component is operable to:
   provide a first web page to a client computing device during a browse session between the network computing component and the client computing device, the first web page comprising a link to a markup file of a second web page, wherein the markup file references a plurality of embedded resources;
   determine at least one prioritized embedded resource of the plurality of embedded resources referenced by the markup file of the second web page, the determination based at least in part on historical processing latencies associated with the at least one prioritized embedded resource, wherein the at least one prioritized embedded resource comprises an image, video, applet, document, style sheet, or code file;
   in response to receiving a notification that a user of the client computing device has initiated a cursor movement toward the link to the markup file of the second web page, initiate retrieval of the at least one prioritized embedded resource prior to retrieving the markup file of the second web page during the browse session and prior to receiving a request from the client computing device for transmission of the markup file of the second web page, wherein the notification is based at least partly on a movement and position coordinate of a cursor; and
   transmit, to the client computing device, the prioritized embedded resource prior to receiving a request from the client computing device for transmission of the markup file of the second web page.

2. The system of claim 1, wherein the historical processing latencies comprise retrieval latencies observed during processing of prior requests for the at least one prioritized embedded resource.

3. The system of claim 1, wherein the historical processing latencies comprise rendering times observed during processing of prior requests for the at least one prioritized embedded resource.

4. The system of claim 1, wherein the at least one prioritized embedded resource is transmitted to the client computing device in response to the user clicking the link.

5. The system of claim 1, wherein the at least one prioritized embedded resource is transmitted to the client computing device prior to the user clicking the link.

6. A computer-implemented method comprising:
as performed by one or more computer processors configured to execute specific instructions,
hosting an instance of a browsing application, the instance of the browsing application in a browse session with a browsing application of a client computing device;
in response to a request from the client computing device for a network resource:
retrieving the network resource, wherein the network resource comprises a link to a linked network resource, and wherein the linked network resource references a plurality of embedded resources;
transmitting the network resource to the client computing device;
determining at least one prioritized embedded resource of the plurality of embedded resources referenced by the linked network resource, the determination based at least in part on historical processing latencies associated with the at least one prioritized embedded resource; and
retrieving the at least one prioritized embedded resource associated with the linked network resource prior to retrieving the linked network resource during the browse session; and
in response to receiving, from the client computing device, a notification that there is a likelihood exceeding a threshold that a user of the client computing device will activate the link, processing at least a portion of one of the linked network resource or the embedded resource in the instance of the browsing application prior to activation of the link to the linked network resource by the user of the client computing device, wherein the notification is based at least partly on a detected user hand movement.

7. The computer-implemented method of claim 6, wherein the network resource and linked network resource are web pages.

8. The computer-implemented method of claim 6, further comprising retrieving the entire linked network resource prior to the user activating the link.

9. The computer-implemented method of claim 6, wherein the historical processing latencies comprise retrieval latencies observed during processing of prior requests for the linked network resource.

10. The computer-implemented method of claim 6, wherein the historical processing latencies compromise rendering times observed during processing of prior requests for the linked network resource.

11. A system for retrieval of prioritized resources, the system comprising:
a network computing component comprising an executable software module in a memory, the executable software module executed by one or more computer processors, wherein the network computing component is operable to:
determine at least one prioritized embedded resource associated with a network resource, the network resource comprising a plurality of embedded resources, wherein the determination based at least in part on historical processing latencies associated with the at least one prioritized embedded resource;
establish a browse session with a client computing device; and
in response to receiving a notification that there is a likelihood exceeding a threshold that a user of the client computing device will activate a link to the network resource, initiate retrieval of the at least one prioritized embedded resource prior to retrieving the network resource during the browse session and prior to activation of the link to the network resource by the client computing device, wherein the notification is based at least partly on a detected user eye movement.

12. The system of claim 11, wherein the network resource is a web page.

13. The system of claim 11, wherein the at least one prioritized embedded resource comprises an image, video, applet, document, style sheet, or code file.

14. The system of claim 11, wherein the determination is further based at least in part on the at least one prioritized embedded resource being referenced by another embedded resource of the plurality of embedded resources.

15. The system of claim 11, wherein the determination is further based at least in part on a display position of the at least one prioritized embedded resource within the network resource.

16. The system of claim 11, wherein the at least one prioritized embedded resource is transmitted to the client computing device in response to the user clicking the link to the network resource.

17. The system of claim 11, wherein the at least one prioritized embedded resource is transmitted to the client computing device prior to the user clicking the link to the network resource.

18. The system of claim 17, wherein a second embedded resource is transmitted to the client computing device prior to the user clicking the link to the network resource, wherein the second embedded resource is associated with a second network resource, and wherein the second embedded resource is not one of the plurality of embedded resources of the network resource.

19. The system of claim 11 wherein the historical processing latencies comprise retrieval latencies observed during processing of prior requests for the network resource.

20. The system of claim 11, wherein the historical processing latencies compromise rendering times observed during processing of prior requests for the network resource.

21. A non-transitory computer storage medium that stores an executable browser component that directs a user computing device to perform a process that comprises:
receiving, from a network computing component, a requested network resource during a browse session, wherein the requested network resource comprises a link to a linked network resource separate from the requested network resource, and wherein the linked network resource references one or more embedded resources;

determining, based at least partly on historical interaction data associated with a user, that there is a likelihood exceeding a threshold that the user will activate the link;

in response to the determination, transmitting, to the network computing component, a notification, said notification causing the network computing component to begin transmitting at least one of the one or more embedded resources prior to activation of the link to the linked network resource by the user computing device; and receiving, from the network computing component, at least one of the one or more embedded resources prior to receiving the linked network resource during the browse session.

22. The non-transitory computer storage medium of claim 21, wherein the notification comprises an indication of the likelihood that the user will activate the link.

23. The non-transitory computer storage medium of claim 21, wherein the notification comprises a request for the linked network resource.

24. The non-transitory computer storage medium of claim 21, wherein the notification comprises a network address of the linked network resource.

25. The non-transitory computer storage medium of claim 24, wherein the notification further comprises one or more network addresses of links located between a current location of a cursor and a predicted destination of the cursor.

26. The non-transitory computer storage medium of claim 21, wherein the determination is based at least partly on a velocity measurement of a cursor, wherein movement of the cursor directed by the user.

27. The non-transitory computer storage medium of claim 21, wherein the determination is based at least partly on an eye movement of the user.

28. The non-transitory computer storage medium of claim 21, wherein the determination is based at least partly on a hand movement of the user.

* * * * *